US012769986B2

(12) United States Patent
Anderson et al.

(10) Patent No.: US 12,769,986 B2
(45) Date of Patent: Oct. 20, 2026

(54) MAPPING METHOD AND APPARATUS

(71) Applicant: CANON KABUSHIKI KAISHA, Tokyo (JP)

(72) Inventors: Owen Anderson, Edinburgh (GB); Ian Poole, Edinburgh (GB)

(73) Assignee: CANON KABUSHIKI KAISHA, Tokyo (JP)

( * ) Notice: Subject to any disclaimer, the term of this patent is extended or adjusted under 35 U.S.C. 154(b) by 618 days.

(21) Appl. No.: 18/350,796

(22) Filed: Jul. 12, 2023

(65) Prior Publication Data

US 2025/0021801 A1 Jan. 16, 2025

(51) Int. Cl.
*G06N 3/0464* (2023.01)

(52) U.S. Cl.
CPC .................................. *G06N 3/0464* (2023.01)

(58) Field of Classification Search
CPC ............................. G06N 3/0464; G06N 3/045
See application file for complete search history.

(56) References Cited

U.S. PATENT DOCUMENTS 9,665,799 B1 * 5/2017 Munteanu ............ G06V 10/955
9,830,526 B1 * 11/2017 Lin ........................ G06N 3/084
10,007,865 B1 * 6/2018 Kim ....................... G06N 3/084
10,366,328 B2 * 7/2019 Yang ...................... G06N 3/063
10,402,978 B1 * 9/2019 Kim ....................... G06V 10/82
11,182,545 B1 * 11/2021 Tsai ...................... G06F 40/177
11,328,239 B2 * 5/2022 Baek .................... G06N 3/0464
11,640,533 B2 * 5/2023 Whatmough .......... G06N 3/082 706/25
11,705,230 B1 * 7/2023 Jain ........................ G16H 20/10 705/3

(Continued)

FOREIGN PATENT DOCUMENTS

CN 102184349 A 9/2011
CN 107133496 A 9/2017

(Continued)

OTHER PUBLICATIONS

Khalifa, Nour Eldeen et al., Artificial Intelligence Technique for Gene Expression by Tumor RNA-Seq Data: A Novel Optimized Deep Learning Approach, vol. 4, 2016, IEEE Access. 8. 22874-22883. 10.1109/ACCESS.2020.2970210.

(Continued)

*Primary Examiner* — Aravind K Moorthy
(74) *Attorney, Agent, or Firm* — Oblon, McClelland, Maier & Neustadt, L.L.P.

(57) ABSTRACT

An apparatus comprises processing circuitry configured to: acquire convolutional neural network (CNN) layers; and train a first mapping layer which connects to an input layer of the CNN layers, and a second mapping layer which connects to an output layer of the CNN layers, wherein the first mapping layer maps omics input data to N-dimensional data, and wherein the second mapping layer receives further N-dimensional data that is output by the CNN layers and maps the further N-dimensional data to omics output data; wherein the training of the first mapping layer and the second mapping layer comprises fixing parameters of the CNN layers and minimizing a loss function, wherein the loss function is dependent on the input omics data and the output omics data.

18 Claims, 11 Drawing Sheets

| Index | Gene | Normalised expression |
|---|---|---|
| 1 | AM2 | 1.43 |
| 2 | ADCY5 | 0.65 |
| 3 | AGPAT2 | 3.74 |
| 4 | APC | 1.50 |
| .... | .... | .... |
| 3,500 | EGFR | 0.87 |
| 3,501 | KRAS | 2.12 |
| 3,502 | P53 | 3.16 |
| .... | .... | .... |
| 9,999 | XRCC6 | 0.30 |
| 10,000 | YWHAZ | 1.43 |

(56) References Cited

U.S. PATENT DOCUMENTS

| | | | | |
|---|---|---|---|---|
| 11,954,593 | B2 * | 4/2024 | Lahrmann | G06F 21/00 |
| 12,154,025 | B1 * | 11/2024 | Savic | G06F 3/0659 |
| 12,224,044 | B1 * | 2/2025 | Li | G06N 3/0455 |
| 12,387,508 | B2 * | 8/2025 | Liu | G16B 15/00 |
| 12,521,634 | B1 * | 1/2026 | Chorakhalikar | A63F 13/77 |
| 2009/0037507 | A1 | 2/2009 | Rosman et al. | |
| 2013/0005596 | A1 | 1/2013 | Gong et al. | |
| 2015/0262082 | A1 | 9/2015 | Vaske et al. | |
| 2016/0196672 | A1 * | 7/2016 | Chertok | G06T 11/26<br>382/156 |
| 2017/0103309 | A1 * | 4/2017 | Chang | G06N 3/045 |
| 2017/0169327 | A1 * | 6/2017 | Nestler | G06N 3/065 |
| 2017/0221176 | A1 * | 8/2017 | Munteanu | G06T 1/60 |
| 2018/0108139 | A1 * | 4/2018 | Abramoff | G06T 7/11 |
| 2018/0357507 | A1 * | 12/2018 | Gelbman | G06V 10/82 |
| 2018/0365372 | A1 * | 12/2018 | Araya | G16B 40/30 |
| 2019/0066268 | A1 * | 2/2019 | Song | G06T 5/70 |
| 2019/0114390 | A1 * | 4/2019 | Donner | G16B 20/00 |
| 2019/0130282 | A1 * | 5/2019 | Quirk | G06N 3/08 |
| 2020/0097820 | A1 * | 3/2020 | Song | G06N 3/045 |
| 2020/0193270 | A1 * | 6/2020 | Wu | G06N 3/082 |
| 2020/0210852 | A1 * | 7/2020 | Igartua | G16B 30/10 |
| 2020/0242404 | A1 * | 7/2020 | Teshima | G06N 3/08 |
| 2020/0302297 | A1 * | 9/2020 | Jaganathan | G06F 16/58 |
| 2020/0311198 | A1 * | 10/2020 | Poon | G06N 3/09 |
| 2020/0357482 | A1 * | 11/2020 | Devesa | G16B 50/10 |
| 2020/0394459 | A1 * | 12/2020 | Xu | G06T 11/10 |
| 2021/0100468 | A1 * | 4/2021 | Yu | A61B 5/7267 |
| 2021/0142173 | A1 * | 5/2021 | Cheng | G16H 50/70 |
| 2021/0150348 | A1 * | 5/2021 | MacKenzie | A61B 5/31 |
| 2021/0151123 | A1 * | 5/2021 | Araya | G16B 20/20 |
| 2021/0166150 | A1 * | 6/2021 | Wang | G06N 20/00 |
| 2021/0232927 | A1 * | 7/2021 | Lin | G06N 3/0464 |
| 2021/0265018 | A1 * | 8/2021 | Dutta | G06N 3/044 |
| 2021/0319059 | A1 * | 10/2021 | Vianello | G06N 3/0464 |
| 2021/0334663 | A1 * | 10/2021 | Shen | G06N 3/0464 |
| 2021/0366577 | A1 * | 11/2021 | Koller | G16B 40/20 |
| 2021/0374546 | A1 * | 12/2021 | Tsai | G11C 13/0069 |
| 2022/0004430 | A1 * | 1/2022 | Vega | G06F 9/4881 |
| 2022/0004849 | A1 * | 1/2022 | Chen | G06N 3/045 |
| 2022/0027749 | A1 * | 1/2022 | Bigaj | G06N 5/04 |
| 2022/0028547 | A1 * | 1/2022 | Ng | A61B 1/00009 |
| 2022/0068438 | A1 | 3/2022 | Regev et al. | |
| 2022/0076129 | A1 * | 3/2022 | Kasioumis | G06N 3/0464 |
| 2022/0139498 | A1 * | 5/2022 | Davis | G16B 20/30<br>706/12 |
| 2022/0165356 | A1 * | 5/2022 | Bepler | G06N 3/09 |
| 2022/0180975 | A1 * | 6/2022 | Regev | G16B 40/30 |
| 2022/0222817 | A1 * | 7/2022 | AlRegib | G06V 10/82 |
| 2022/0261599 | A1 * | 8/2022 | Kastaniotis | G06F 18/2155 |
| 2022/0301140 | A1 * | 9/2022 | Kawamura | G06T 7/0002 |
| 2022/0319675 | A1 * | 10/2022 | Mork | G06N 3/0475 |
| 2022/0327810 | A1 * | 10/2022 | Nagori | G06N 3/0464 |
| 2022/0336055 | A1 * | 10/2022 | Hamp | G06N 20/00 |
| 2022/0336057 | A1 * | 10/2022 | Hamp | G06N 3/044 |
| 2022/0399101 | A1 * | 12/2022 | Cai | G16H 50/20 |
| 2022/0405887 | A1 * | 12/2022 | Alhammad | G06T 5/60 |
| 2022/0406304 | A1 * | 12/2022 | Marzorati | G06F 3/167 |
| 2022/0414396 | A1 * | 12/2022 | Jaiswal | G06N 3/0464 |
| 2023/0047347 | A1 * | 2/2023 | Hamp | G16B 15/20 |
| 2023/0098833 | A1 * | 3/2023 | Li | G16H 70/40<br>705/2 |
| 2023/0154207 | A1 * | 5/2023 | Qi | G08B 21/06<br>382/157 |
| 2023/0188604 | A1 * | 6/2023 | Jang | H04L 67/12<br>370/252 |
| 2023/0199014 | A1 * | 6/2023 | Swift | H04L 63/1433<br>726/25 |
| 2023/0230704 | A1 * | 7/2023 | Adiyoso | A61B 6/03<br>382/131 |
| 2023/0274137 | A1 * | 8/2023 | Makariou | G06N 3/096<br>706/25 |
| 2023/0290438 | A1 * | 9/2023 | Alvarez | G16B 20/00 |
| 2023/0298339 | A1 * | 9/2023 | Parnaby | G06V 10/56<br>382/129 |
| 2023/0300333 | A1 * | 9/2023 | Kubota | H04N 19/124<br>375/240.03 |
| 2023/0401697 | A1 * | 12/2023 | Bradley | G06V 10/7715 |
| 2023/0410484 | A1 * | 12/2023 | Udayamurthy | G06V 20/52 |
| 2023/0415779 | A1 * | 12/2023 | Chien | G06V 20/64 |
| 2023/0419682 | A1 * | 12/2023 | Lee | G06V 20/58 |
| 2024/0004907 | A1 * | 1/2024 | Dana | G06F 40/30 |
| 2024/0104797 | A1 * | 3/2024 | Gong | G06T 12/10 |
| 2024/0330652 | A1 * | 10/2024 | Dolezal | G06N 7/01 |
| 2025/0022124 | A1 * | 1/2025 | Morard | G06T 3/4053 |
| 2025/0378311 | A1 * | 12/2025 | Sabeti | G06N 3/0464 |

FOREIGN PATENT DOCUMENTS

| | | | |
|---|---|---|---|
| CN | 109063753 | A | 12/2018 |
| CN | 112522371 | A | 3/2021 |
| CN | 114091603 | A | 2/2022 |
| CN | 114360654 | A | 4/2022 |
| WO | WO 2021/052283 | A1 | 3/2021 |

OTHER PUBLICATIONS

Mostavi, M. et al., Convolutional neural network models for cancer type prediction based on gene expression. BMC Med Genomics 13 (Suppl 5), 44 (2020). https://doi.org/10.1186/s12920-020-0677-2.

López-García G, et al., (2020) Transfer learning with convolutional neural networks for cancer survival prediction using gene-expression data. PLOS One 15(3): e0230536. https://doi.org/10.1371/journal.pone.0230536.

Shon Ho Sun, et al., Classification of stomach cancer gene expression data using CNN algorithm of deep learning. J Biomed Transl Res 2019;20(1):15-20. https://doi.org/10.12729/jbtr.2019.20.1.015.

M. K. Elbashir, et al., "Lightweight Convolutional Neural Network for Breast Cancer Classification Using RNA-Seq Gene Expression Data," in IEEE Access, vol. 7, pp. 185338-185348, 2019, doi:10.1109/ACCESS.2019.2960722.

Xu, Z., et al., (2020). Correlation via Synthesis: End-to-end Image Generation and Radiogenomic Learning Based on Generative Adversarial Network. Proceedings of the Third Conference on Medical Imaging with Deep Learning, in Proceedings of Machine Learning Research 121:857-866 Available from https://proceedings.mlr.press/v121/xu20a.html.

Sharma, A. et al., DeepInsight: A methodology to transform a non-image data to an image for convolution neural network architecture. Sci Rep 9, 11399 (2019). https://doi.org/10.1038/s41598-019-47765-6.

OmicsMapNet: Transforming omics data to take advantage of Deep Convolutional Neural Network for discovery. S Ma and Z Zhang, Centre for Biomarker Discovery and Translation, John Hopkins Medical Institution.

AggMapNet: enhanced and explainable low-sample omics deep learning with feature aggregated multi-channel networks, W Shen et al, Tsingshua University.

* cited by examiner

| Index | Gene | Normalised expression |
|---|---|---|
| 1 | AM2 | 1.43 |
| 2 | ADCY5 | 0.65 |
| 3 | AGPAT2 | 3.74 |
| 4 | APC | 1.50 |
| .... | .... | .... |
| 3,500 | EGFR | 0.87 |
| 3,501 | KRAS | 2.12 |
| 3,502 | P53 | 3.16 |
| .... | .... | .... |
| 9,999 | XRCC6 | 0.30 |
| 10,000 | YWHAZ | 1.43 |

FIGURE 1

MAPPING METHOD AND APPARATUS

FIELD

The present invention relates to the field of spatial mapping of multidimensional data, in particular when applied to omics data.

BACKGROUND

Omics studies relate to the various branches of science aimed at characterizing biological molecules in order to understand the structure and function of organisms. For example, transcriptomics is the analysis of gene expression data to determine the number and variety of RNA transcripts found in a biological sample.

Gene expression data in a transcriptome may be considered to comprise a normalized count of mRNA molecules found in a tissue sample (for example, a colon polyp or a biopsied tumor). Using known relationships between DNA, RNA and proteins, a transcriptome may be considered to form a proxy for protein expression in the tissue.

A transcriptome can be obtained through RNA sequencing methods that includes microarrays, RNA-seq or probe based assays using a library of targeted primers, such as Temp'O Seq.

A typical gene expression dataset from a sample may contain around 10,000 to 60,000 measurements. If only the RNA that codes for proteins (mRNA) are considered, and if the low expressing genes are filtered out, the dataset can be reduced to around 10,000 measurements. When inspecting the dataset, there is no obvious ordering of the transcriptome results. By default, they are often listed alphabetically by gene name. Ordering based on chromosome position is also possible, but this has little functional significance.

FIG. 1 illustrates extracts from an example of an individual transcriptome which is stored in a spreadsheet. Each gene is given a respective index number. Each gene has an associated normalized gene expression value. In practice, a single spreadsheet may store transcriptomes for a number of patients or other subjects.

Transcriptomes, particularly of tumor biopsies, are widely studied and have been shown to have prognostic value. For example, transcriptomes of excised polyps may be analyzed to provide better stratification in colon cancer screening.

A transcriptomic dataset consisting of gene expression values for a number of samples is typically processed on a cohort basis by differential gene expression analysis. This is often followed by gene set enrichment analysis and visualized in Volcano plots or heat maps. A Volcano Plot comprises a plurality of points where each point is representative of respective gene, plotted as fold-change vs p-value, in respect of a whole cohort. It is not a patient specific plot.

These methods may often be useful for understanding perturbations in individual genes and gene sets. However, these methods typically do not provide an easily interpretable visual representation of the whole dataset for all samples.

The human visual cortex and modern neural network models, which both comprise convolutional network architectures, are good at spotting patterns in 2D images in order to classify them. Images can be meaningfully compared if they are defined or structured in some absolute way. There is therefore a need to present omics data so that it can be meaningfully read by humans and modern neural network models.

Convolutional Neural Networks (CNNs) may be considered to be state of the art in the field of Deep Learning (DL). Their success may be attributed to the reduction of free parameters by performing processing between data which is in proximity, rather than globally. This may reduce the capacity for over-fitting and the capacity to fit to local minima with respect to other DL methods, for example dense neural networks.

For CNNs to be usefully applied, it is applied on input data which has a meaningful ordering. A meaningful ordering may be an ordering in which data that is in proximity is more related than data that is far apart. A meaningful ordered may be meaningful at both a low level and a high level. In the case of imaging, low-level ordering may comprise textures and edges. High-level ordering may pertain to hierarchical groupings of low-level features. High-level features may be more abstract in nature.

The concept of low- and high-level features may be demonstrated by considering the example of an image, for example a photograph of a car. An example of a low-level feature is a texture of a road on which the car is driving, or an edge of the car. An example of a medium-level feature is the car itself, or a further car within the image. An example of a high-level feature is a risk associated with the car.

A CNN may typically decompose an image into both higher-level and lower-level features. For example, different layers of the CNN may be associated with different levels of features.

BRIEF DESCRIPTION OF THE DRAWINGS

Embodiments are now described, by way of non-limiting example, and are illustrated in the following figures, in which:

FIG. 1 shows extracts of a transcriptome in a spreadsheet;

DETAILED DESCRIPTION

Certain embodiments provide an apparatus comprising processing circuitry configured to: acquire convolutional neural network (CNN) layers; and train a first mapping layer which connects to an input layer of the CNN layers, and a second mapping layer which connects to an output layer of the CNN layers, wherein the first mapping layer maps omics input data to N-dimensional data, and wherein the second mapping layer receives further N-dimensional data that is output by the CNN layers and maps the further N-dimensional data to omics output data; wherein the training of the first mapping layer and the second mapping layer comprises fixing parameters of the CNN layers and minimizing a loss function, wherein the loss function is dependent on the input omics data and the output omics data.

Certain embodiments provide a method comprising: acquiring convolutional neural network (CNN) layers; and training a first mapping layer which connects to an input layer of the CNN layers, and a second mapping layer which connects to an output layer of the CNN layers, wherein the first mapping layer maps omics input data to N-dimensional data, and wherein the second mapping layer receives further N-dimensional data that is output by the CNN layers and maps the further N-dimensional data to omics output data; wherein the training of the first mapping layer and the second mapping layer comprises fixing parameters of the CNN layers and minimizing a loss function, wherein the loss function is dependent on the input omics data and the output omics data.

Certain embodiments provide an apparatus comprising processing circuitry configured to: obtain a trained first mapping layer which maps omics input data to N-dimensional data; use the trained first mapping layer to transform a set of omics input data into a set of spatially ordered data; and apply a task-specific model to the spatially ordered data to obtain a task-specific output.

Certain embodiments provide a method comprising: obtaining a trained first mapping layer which maps omics input data to N-dimensional data; using the trained first mapping layer to transform a set of omics input data into a set of spatially ordered data; and applying a task-specific model to the spatially ordered data to obtain a task-specific output.

Figure 2:
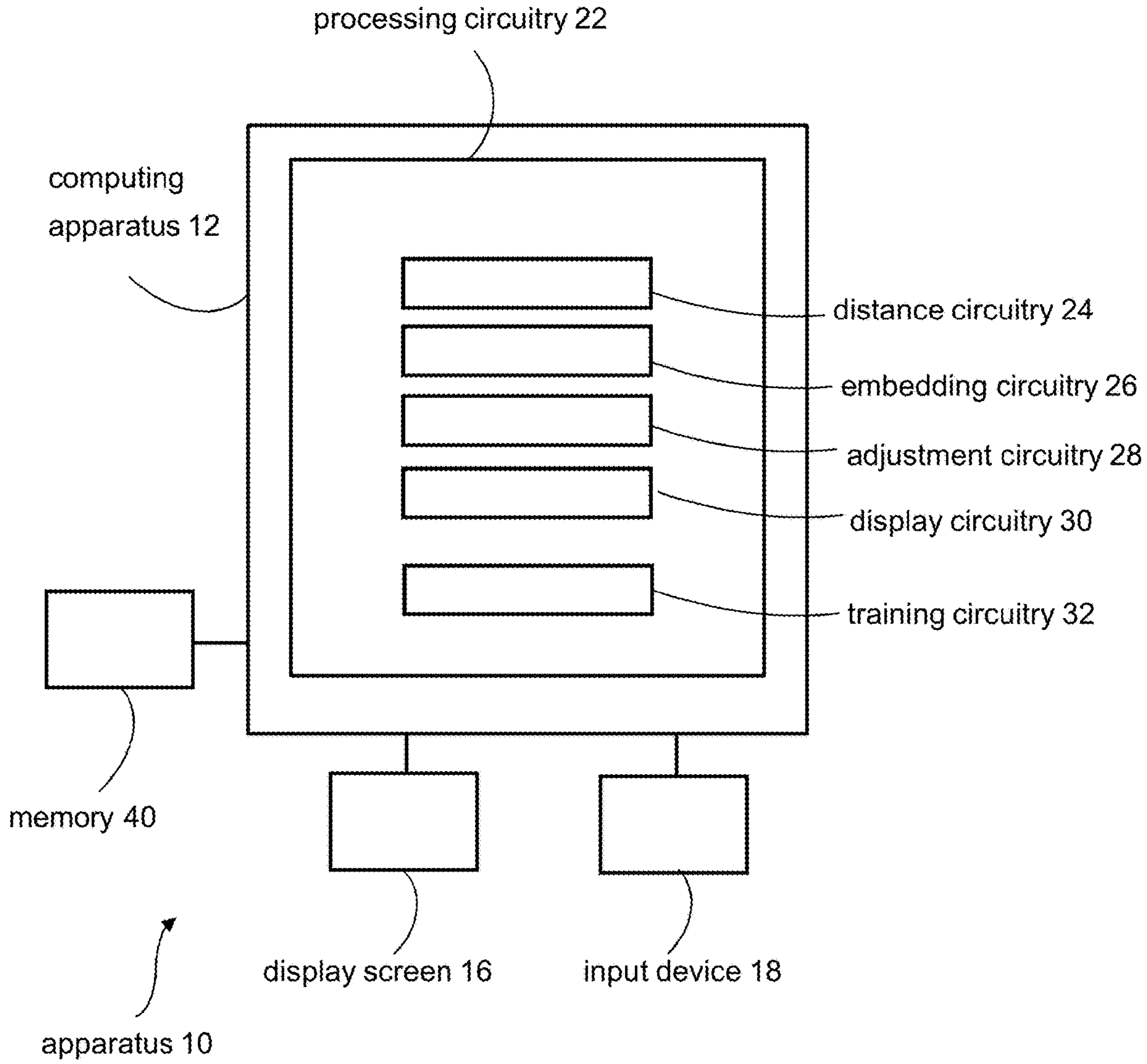
FIG. 2 is a schematic diagram of an apparatus according to an embodiment.

An apparatus 10 according to an embodiment is illustrated schematically in FIG. 2. The apparatus 10 may also be referred to as a medical information processing apparatus. The apparatus 10 is configured to process omics data. The apparatus 10 is further configured to display an image based on the omics data.

The omics data may be any type of omics data that comprises a plurality of values, wherein each value of the plurality of values is associated with a respective biomolecule of a plurality of biomolecules. The data can be, for example, transcriptome data, wherein the biomolecules are genes, and the associated values are expression levels of those genes. Alternatively, the omics data could be another gene related omics data, where the biomolecules are germline DNA, SNPs, or somatic mutations, and the associated values are, for example, a degree of mutational impact. Alternatively, the omics data may correspond to a biomolecule such as a protein or metabolite, with the associated values being protein or metabolite abundance respectively (i.e. the omics data is proteome or metabolome data).

In other embodiments, the apparatus 10 may be configured to process any appropriate data, which may comprise non-omics data, such as any unordered data. For instance, in some embodiments, the apparatus 10 may be configured to process any data comprising a plurality of values, wherein each value of the plurality of values is associated with a respective variable.

The apparatus 10 comprises a computing apparatus 12, which in this case is a personal computer (PC) or workstation. The computing apparatus 12 is connected to a display screen 16 or other display device, and an input device or devices 18, such as a computer keyboard and mouse. The computing apparatus 22 receives data from memory 40, which may also be referred to as a data store or storage. In alternative embodiments, computing apparatus 12 receives data from one or more further data stores (not shown) instead of or in addition to memory 40. For example, the computing apparatus 12 may receive data from one or more remote data stores (not shown), which may comprise cloud-based storage.

The memory 40 stores a two-dimensional image format of display positions for a plurality of biomolecules. The two-dimensional image format maps each of the plurality of biomolecules to pixel positions to be displayed as an image on display screen 16. The two-dimensional image format may be, for example, a matrix in which cells of the matrix are associated with respective biomolecules. In another example, the two-dimensional image format may be an image file format, for example a JPG or BMP file, in which pixel positions of an image are associated with respective biomolecules.

The memory 40 further stores omics data. In other embodiments, the omics data may be stored in another suitable memory, for example in another apparatus or in a cloud-based memory. The omics data can be stored in any file format suitable for storing text-based data such as TSV, CSV, XLS, XML.

Computing apparatus 12 comprises a processing circuitry 22 for processing data. The processing circuitry 22 comprises a central processing unit (CPU) and Graphical Processing Unit (GPU) and/or Tensor Processing Unit (TPU). The processing circuitry 22 provides a processing resource for automatically or semi-automatically processing omics data sets.

The processing circuitry 22 includes a distance circuitry 24 which is configured to, based on the plurality of biomolecules in the omics data, calculate a respective distance between each pair of biomolecules; an embedding circuitry 26 configured to map each of the plurality of biomolecules to a position based on the calculated distances; an image adjustment circuitry 28 configured to adjust the positions to obtain a two-dimensional image format; and a displaying circuitry 30 to display the omics data based on the two-dimensional image format.

In some embodiments, the processing circuitry further includes training circuitry 32 which is configured to train one or more mappings and to train one or more convolutional neural networks (CNNs). In other embodiments, different circuitries or apparatuses may be used to train different mappings or CNNs.

In some embodiments, at least one of distance circuitry 24, embedding circuitry 26 and image adjustment circuitry 28 may be omitted from the processing circuitry 22.

In the present embodiment, the circuitries 24, 26, 28 and 30 are each implemented in the CPU and/or GPU and/or TPU by means of a computer program having computer-readable instructions that are executable to perform the method of the embodiment. In other embodiments, the circuitries may be implemented as one or more ASICs (application specific integrated circuits) or FPGAs (field programmable gate arrays).

The computing apparatus 12 also includes a hard drive and other components of a PC including RAM, ROM, a data bus, an operating system including various device drivers, and hardware devices including a graphics card. Such components are not shown in FIG. 2 for clarity.

Figure 3:
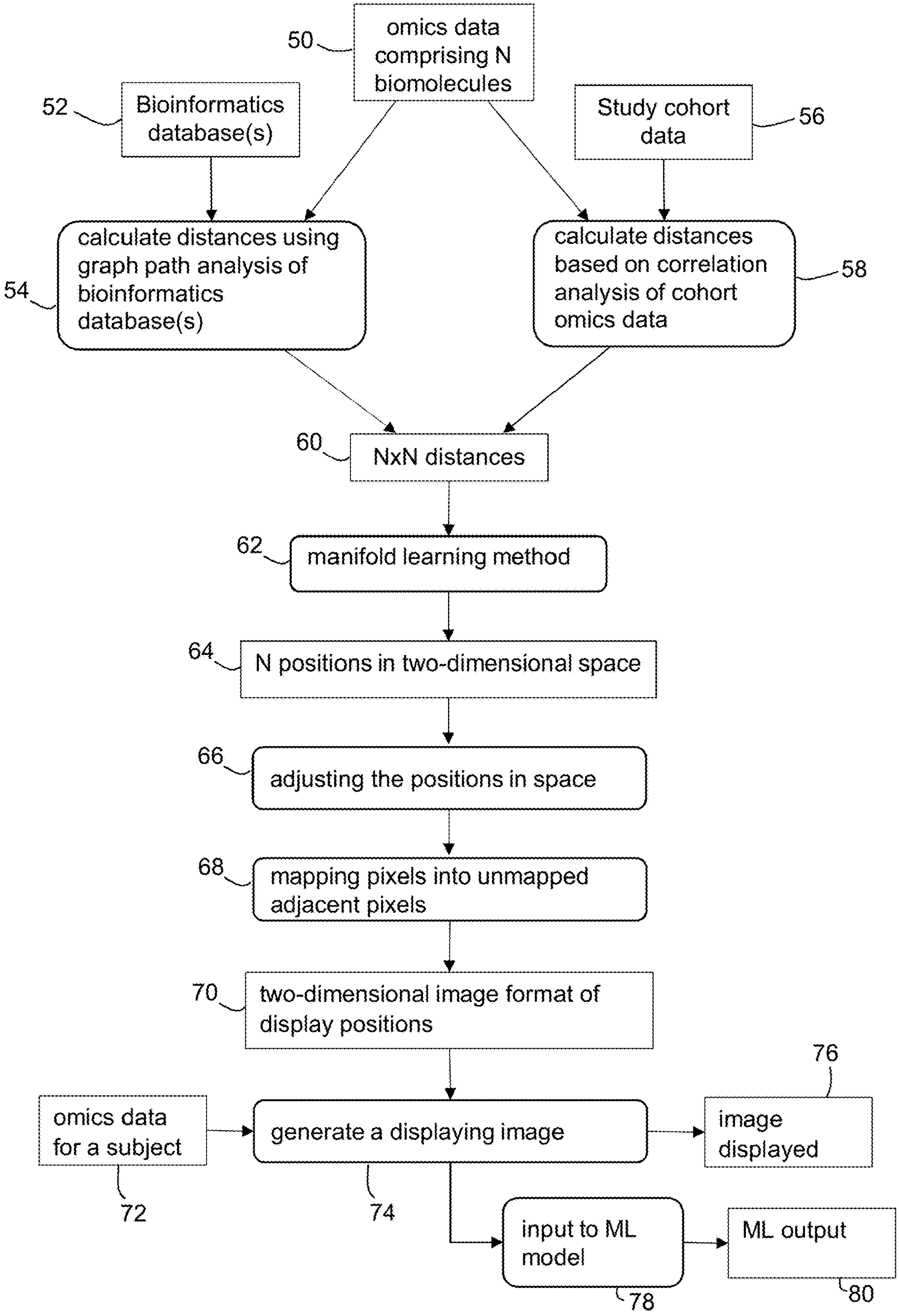
FIG. 3 is a flow chart illustrating in overview a method in accordance with an embodiment.

The processing circuitry 22 of FIG. 2 is configured to perform a method in accordance with FIG. 3. FIG. 3 is a flow chart illustrating in overview a method of generating a two-dimensional image format for a plurality of biomolecules and subsequently displaying an image based on the two-dimensional image format.

At stage 50, omics data is received by the distance circuitry 24 from the memory 40 or from any suitable data store. The omics data comprises a plurality of values, wherein each value of the plurality of values is associated with a respective biomolecule of a plurality of biomolecules. The plurality of biomolecules comprises N biomolecules. In the present embodiment, the biomolecules are genes that are associated with a respective gene expression value. In other embodiments, the omics data received by the distance circuitry 24 at stage 50 may comprise only a list of N biomolecules, for example a list of N genes, without also comprising values associated with the N biomolecules.

Stages 54 and 58 each provide a method of calculating distances between the N biomolecules. In some embodiments, stage 54 is performed and stage 58 is omitted. In other embodiments, stage 58 is performed and stage 54 is omitted. In further embodiments, stage 54 and stage 58, or outputs from stage 54 and stage 58, may be combined in any appropriate combination to obtain distances between the N biomolecules.

An input to stage 54 is data 52 from one or more bioinformatics databases, which may also be referred to as biological databases. A bioinformatics database or biological database may be a database that stores knowledge using a network, or knowledge graph, such as the STRING (Search Tool for the Retrieval of Interacting Genes/Proteins) or KEGG (Kyoto Encyclopedia of Genes and Genomes) database. In such a database, biomolecules are represented by nodes which are connected to each other by edges if the scientific literature indicates that they have an interaction. Edges may be weighted based on the strength of that interaction or based on the confidence in how likely that interaction is thought to be true.

At stage 54, distance circuitry 24 selects each pair of biomolecules from the plurality of biomolecules in turn and calculates a respective distance between each pair of biomolecules from the plurality of biomolecules using the data obtained from the bioinformatics database or databases. Distances are calculated for each possible pairing.

Using the STRING network as an example, which represents proteins by nodes and weights the edges by a confidence value, the distance between the two connected proteins may be calculated using 1−the confidence value. If two proteins are not directly connected, a distance may be found based on the minimum path distance between the two nodes.

A protein-protein network such as STRING may be used to determine distances between genes when those genes code for proteins. For example, when there are N genes, an N×N distance matrix may be calculated by, for each pair of genes defining a cell of the distance matrix, calculating a distance value between the two proteins that respective pair of genes code for, using information from the STRING network.

As an alternative to the STRING database, other databases may be used, for example databases that store connections between genes based on their co-expression, or databases that store connections between DNA, RNA or protein sequences based on sequence homology. Other databases may also be used which store connections between biomolecules based on their shared activity in biochemical pathways, or based on co-occurring mentions in academic papers.

The distance circuitry 24 outputs the distances 60 that were obtained at stage 54. The distances may be stored as a distance matrix of dimension N×N, where N is the number of biomolecules. Alternatively, the distances may be stored as a list or as any suitable data structure for storing numerical values.

An input to stage 58 is study cohort data 56 which comprises data, for example transcriptome data, for a plurality of individuals in a study cohort. For example, a cohort may comprise data relating to hundreds or thousands of patients or other subjects. Any suitable cohort data may be used.

At stage 58, distance circuitry 24 selects each pair of biomolecules from the plurality of biomolecules in turn and calculates a respective distance between each pair of biomolecules from the plurality of biomolecules using the data obtained from the study cohort. Distances are calculated for each possible pairing.

Distances between pairs of biomolecules are calculated by performing a correlation analysis. For example, for each pair of biomolecules, a respective correlation coefficient, such as the sample correlation coefficient, is calculated based on the values associated with that pair of biomolecules across the subjects in the cohort. Once the sample correlation coefficient is found, the distance is calculated by taking an inverse of the correlation coefficient. In this way, highly correlated biomolecules will have a correspondingly short distance between them. In other embodiments, any suitable method of obtaining a distance from cohort data may be used.

For example, for transcriptomics data comprising N genes, an N×N correlation matrix is generated comprising the correlation coefficients for each pair of genes, wherein high correlation values correspond to similar expression patterns between the respective pair genes. An N×N distance matrix is then generated by, for each cell of the distance matrix, taking the corresponding correlation coefficient from the correlation matrix and obtaining an inverse by calculating either:

1−correlation coefficient, or

1/correlation coefficient.

In other embodiments, any suitable measure of correlation may be used, and any suitable inverse may be used.

The distance circuitry 24 outputs the distances 60 that were obtained at stage 58. The distances may be stored as a distance matrix of dimension N×N, where N is the number of biomolecules. Alternatively, the distances may be stored as a list or as any suitable data structure for storing numerical values.

In some embodiments, the distances 60 are obtained by stage 54 alone. In other embodiments, the distances 60 are obtained by stage 58 alone. In further embodiments, the distances 60 are obtained by a combination of stage 54 and stage 58, or by combining outputs of stage 54 and stage 58.

At stage 62, the distance circuitry 24 passes the calculated distances to the embedding circuitry 26. The embedding circuitry 26 performs a mapping method, which in the present embodiment is a manifold learning method, to embed the plurality of biomolecules into two-dimensional space based on the calculated distances 60. In other embodiments, the mapping method used to embed the biomolecules in two-dimensional space may not comprise a manifold learning method. Any appropriate mapping method may be used.

The manifold learning method may be a method such as multidimensional scaling (MDS) algorithm which projects a set of elements from a higher-dimensional space to a lower-dimensional space (such as two-dimensional) while as far as possible preserving some defined distance between the elements. As a result, biomolecules that have a short calculated distance between them will also be positioned close to each other in the embedding.

The two-dimensional embedding assigns a position to each of the biomolecules of the plurality of biomolecules. The position is a position in two-dimensional space, for example expressed as an x, y co-ordinate value. Biomolecules that are correlated are expected to be assigned positions that are close together in the two-dimensional space.

In other embodiments, any suitable dimension reduction method may be used to obtain co-ordinate values in two-dimensional space for the biomolecules using the calculated distances, for example UMAP (Uniform Manifold Approximation and Projection) or t-SNE (Stochastic Neighbour Embedding).

In some embodiments in which the biomolecules are genes, a manifold learning method is applied to a N×N gene distance matrix to obtain a two-dimensional embedding which assigns a respective position in a two-dimensional space to each gene. The embedding preserves the gene-gene distances such that genes mapped close together are correlated. It is also envisaged that the manifold learning method may be applied to any other suitable data structure comprising the calculated distances.

The embedding circuitry 26 outputs an embedding comprising a set of two-dimensional co-ordinate values 64 comprising a respective two-dimensional co-ordinate value for each of the N biomolecules.

Figure 4:
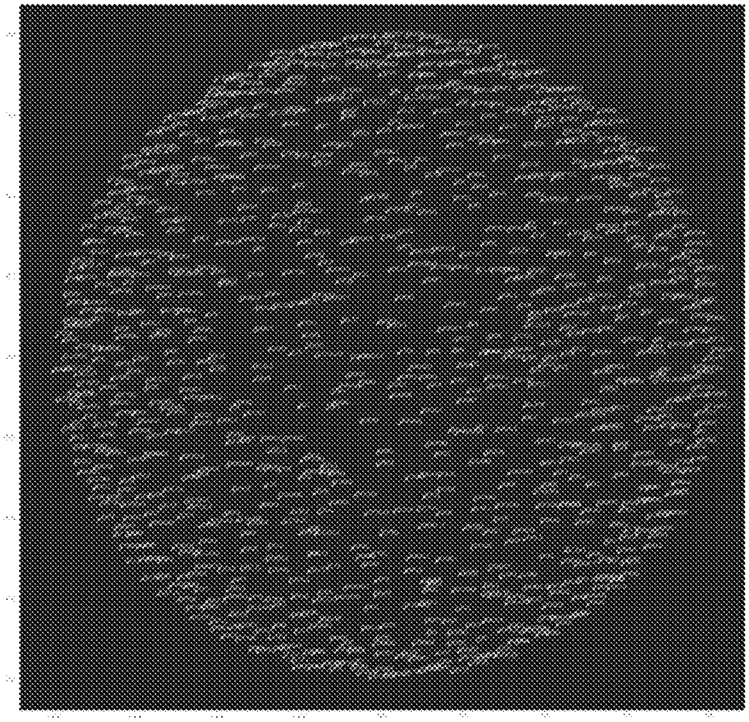
FIG. 4 is an exemplary image showing points output by a manifold learning method.

FIG. 4 illustrates an example of a set of two-dimensional co-ordinate values that are output from stage 64. In the example of FIG. 4, the biomolecules are genes, and the manifold learning method is MDS. The positions that are output by MDS are labelled with their associated genes.

This mapping between genes and positions may be used to show a transcriptome for a single patient or other subject, for example by coloring the points in dependence on whether the corresponding gene is under-expressed, over-expressed or little changed compared to cohort values. The coloring may be based on Z score, where a Z score indicates how many standard deviations a value is above or below the mean. In one example, points representing genes that are over-expressed are colored in red, points representing genes that are under-expressed are colored in blue, and points representing genes that are little changed are colored in grey.

In the embodiment illustrated in FIG. 4, the positions that are output by the MDS are restricted to an area defined by a circle. It is therefore the case that the positions that are output do not cover all of a square two-dimensional space. This can make it more difficult to visually inspect an image based on the embedding, since there will typically be many positions located at the perimeter of the circle, and no positions outside of the circle. The 2D placement of genes provides by MDS is unevenly distributed in the two-dimensional space.

At stage 66, adjustment circuitry 28 receives the embedding comprising the two-dimensional co-ordinate values 64 and adjusts at least some of the positions in the embedding to achieve a more even distribution of the positions over two-dimensional space. This may make it easier to visually inspect a resulting image.

In the present embodiment, the adjustment circuitry 28 receives x,y co-ordinate values and adjusts them so that they are more evenly distributed over two-dimensional space. In alternative embodiments, the adjustment circuitry 28 may map the x,y co-ordinate values to respective pixel positions and adjust the pixel positions so that they are more evenly distributed over an image.

The adjustment circuitry 28 adjusts the co-ordinate values or pixel positions, by, for example, applying an image distortion technique. The image distortion technique may be a spatial transformation, for example a square transformation. Once the positions are adjusted by the spatial transformation, they are more evenly spread across the whole of the two-dimensional space while, as much as possible, maintaining the relative distances between the positions output from MDS.

In other embodiments, the adjusting of the co-ordinate values or pixel positions may comprise perturbing the position corresponding to each biomolecule such that the adjusted positions lie equally spaced on a two-dimensional grid.

Figure 5:
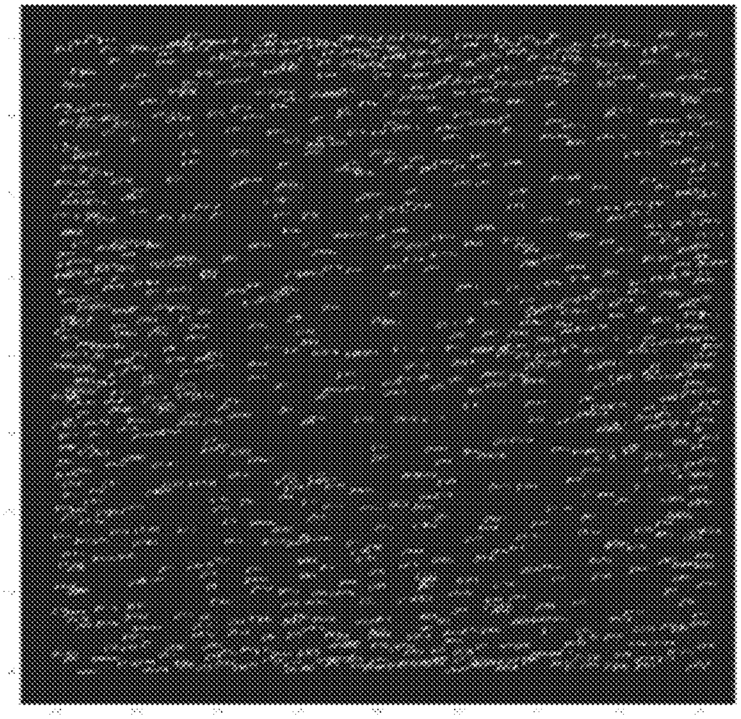
FIG. 5 is an exemplary image showing points after adjustment of position.

FIG. 5 shows an example of adjusted positions which are obtained by adjusting the positions shown in FIG. 4. In FIG. 4, the two-dimensional space is square and the unadjusted x, y co-ordinate values are distributed in a circular region of the two-dimensional space. The adjustment comprises a square transformation which distributes the positions over the whole of the square two-dimensional space. The adjustment may also comprise a non-linear radial scaling to account for clustering of positions at the periphery of the circle.

FIG. 5 shows the result of a square transformation that performs distortion of the two-dimensional co-ordinate values to fill a square. In the example of FIG. 5, the biomolecules are genes, and each adjusted position is labelled with its corresponding gene.

At stage 68, the adjustment circuitry 28 applies an image morphology method to the adjusted positions. If the adjusted positions are x,y co-ordinate values, the adjustment circuitry 28 first maps the co-ordinate values to respective pixel positions. If the adjusted positions are pixel positions, then the image morphology method is applied directly to the pixel positions.

Before the image morphology method is performed, each of the N biomolecules is mapped to a respective single pixel in two-dimensional image space. The number of pixels may be large compared to N, so there may be many pixels to which no biomolecule has yet been mapped. Such pixels may be described as unmapped pixels. If a gene is substantially unrelated to other genes, the pixel representing that gene may be surrounded by more unmapped pixels than a pixel representing a gene that has many related genes.

The adjustment circuitry 28 applies an image morphology method, such as dilation, to expand at least some of the mapped pixels into un-mapped adjacent pixels. A single biomolecule is initially mapped to a single pixel. After the image morphology method is applied, the biomolecules may be mapped to two, three, four, five or more pixels. The mapping is preserved such that each biomolecule is mapped to a group of adjacent pixels. This results in a map of biomolecules. When transcriptomics data is used, the resultant map is a gene map. The image morphology method may be such that, once the image morphology method has been performed, no unmapped pixels remain. In alternative embodiments, some unmapped pixels may be retained, for example to form borders between regions representing different biomolecules.

The adjustment circuitry 28 outputs a two-dimensional image format which comprises display positions for each biomolecule of the plurality of biomolecules. In the embodiment of FIG. 3, the display positions are pixel positions. The image format associates each biomolecule with a respective one or more pixels.

Figure 6:
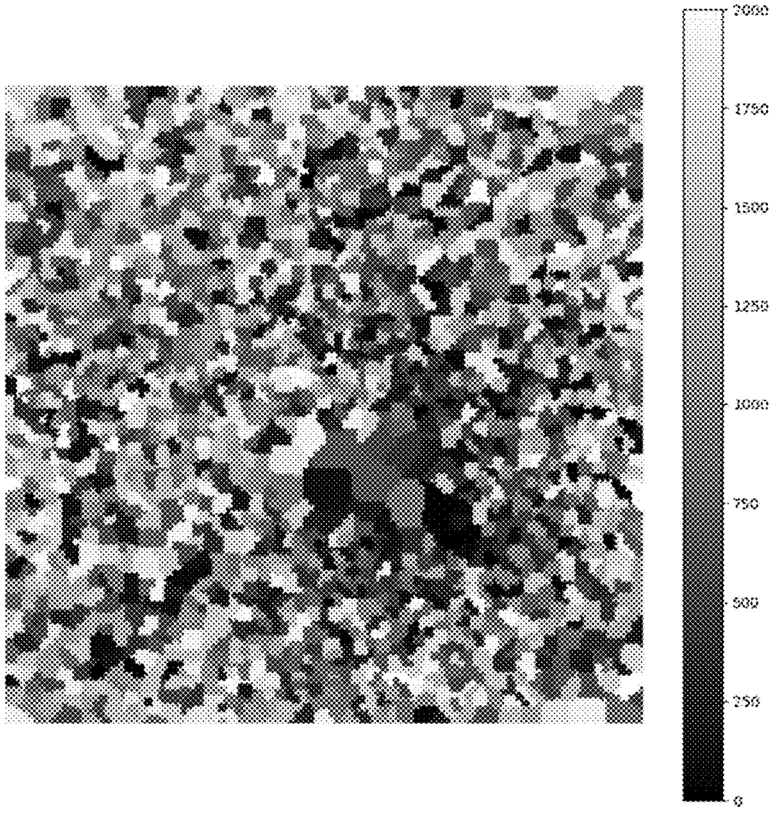
FIG. 6 is an example of a gene map.

In some embodiments, the displaying circuitry 30 renders an index image, for example, a square gene map, using the display positions of the two-dimensional image format. In the index image, display positions (for example, pixels or groups of pixels) are colored in accordance with the gene (or other biomolecule) that they represent. FIG. 6 shows an example of a gene map which illustrates around 900 genes. A scale of the gene map represents gene index numbers by a color scale (represented in FIG. 6 by greyscale). Different colors represent different genes. Genes with sequential index numbers are not usually expected to be adjacent in the gene map, since index number is not indicative of correlation. Adjacent regions of the map often do not have similar colors. In other embodiments, no index image is rendered.

The two-dimensional image format is stored in memory 40. Alternatively, the two-dimensional image format may be stored in one or more remote data stores (not shown), which may comprise cloud-based storage.

At stage 74, the display circuitry 30 receives the two-dimensional image format from memory 40 or any suitable data store. The display circuitry 74 also receives omics data 72 from memory 40 or any suitable data store. In the embodiment of FIG. 5, the omics data comprises data for a single patient or other subject, for example transcriptome data. In other embodiments, the omics data comprises data for multiple subjects. The omics data may be stored in a format as represented in FIG. 1.

The display circuitry 30 generates a displaying image 20 by, for each biomolecule of the plurality of biomolecules defined in the two-dimensional image format, using the associated value from the omics data to determine a color for the display position for that biomolecule. The colors may be determined using a color map which transforms the values associated with the biomolecules to a color scale. The displaying image 20 is rendered using the colors that are determined for all display positions in the displaying image 20. Values from the omics data are therefore mapped onto the displaying image 20 based on the display positions defined in the two-dimensional image format.

In some embodiments, the values associated with the biomolecules are normalized values. For instance, if the omics data only comprises one sample, the values may be Z-score normalized based on all of the values comprised in that sample. If the omics data comprises more than one sample, the values associated with a specific biomolecule may be Z-score normalized based on values from all samples for that biomolecule. By displaying normalized values, it is easier to visually inspect the data to determine which biomolecules are over- or under-expressed, or activated, compared to an average. As an alternative, other normalization methods may be used such as mix-max scaling.

In the embodiment of FIG. 3, the omics data is transcriptome data and the color scale is representative of gene expression value. Gene expression values in the omics data, which are specific to a patient, are converted to Z-score values with respect to a cohort. The Z-score values are then used to determine color in the displaying image. For example, the color scale may color pixels that are representative of genes that are over-expressed in red, pixels that are representative of genes that are under-expressed in blue, and pixels representative of genes that are little changed in grey. In other embodiments, any suitable color scale may be used to represent any suitable values included in the omics data.

If the omics data comprises data from more than one subject, the displaying image 20 comprises a respective image for each patient, with the respective values for that patient mapped to the image. The same two-dimensional image format is used for each of the images. The two-dimensional image format therefore only has to be generated once for the omics data. Using the same two-dimensional image format for all of the images allows the data from each patient to be easily compared. For example, a position in two-dimensional that represents a given gene in a first image will also represent that same gene in a second, different image.

At stage 76, the display circuitry 30 displays the displaying image 20 on a display screen, for example the display screen 16. The displaying image 20 is displayed for human inspection.

Figure 7:
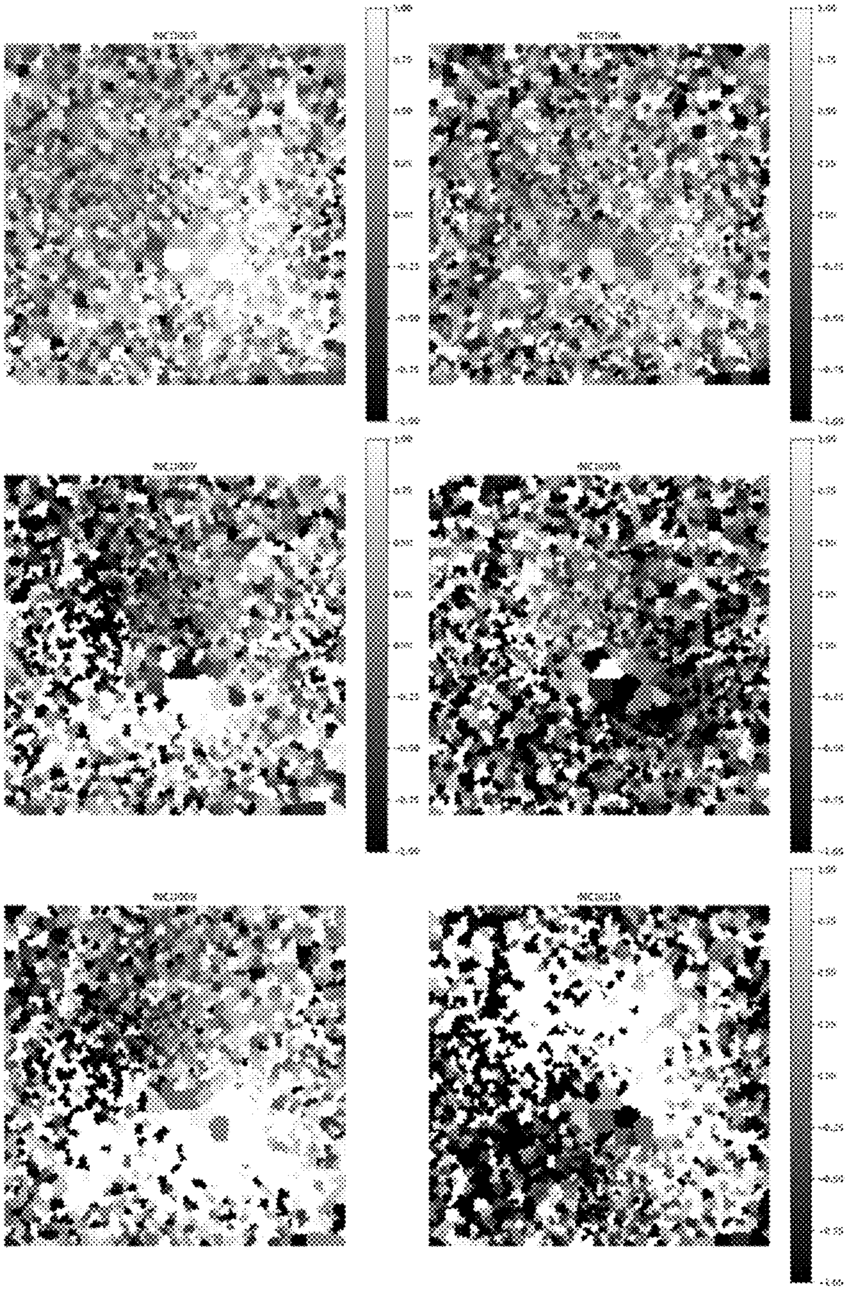
FIG. 7 is an example of a displaying image for six subjects.

In one embodiment, as shown in FIG. 7, display circuitry 30 displays the images for each subject side by side, so that the data for each patient can be quickly compared. In FIG. 7, six individual transcriptome images are rendered using the same two-dimensional image format. Colors (shown as greyscale in FIG. 7) are representative of over- or under-expression. Regions of over- and under-expression show coherence. The coherence may provide a further indication that related genes are mapped in proximity to each other. It may be seen that the images for the six patients are visibly different.

In another embodiment, the display circuitry 30 presents one image at a time, and provides the functionality to allow a user to switch between images in the same window, for example by using the input device 18 to provide an input that triggers display of a different image. For example, a different image may be displayed in response to a user input such as a click, a keystroke, or repositioning of a slider.

Figure 8:
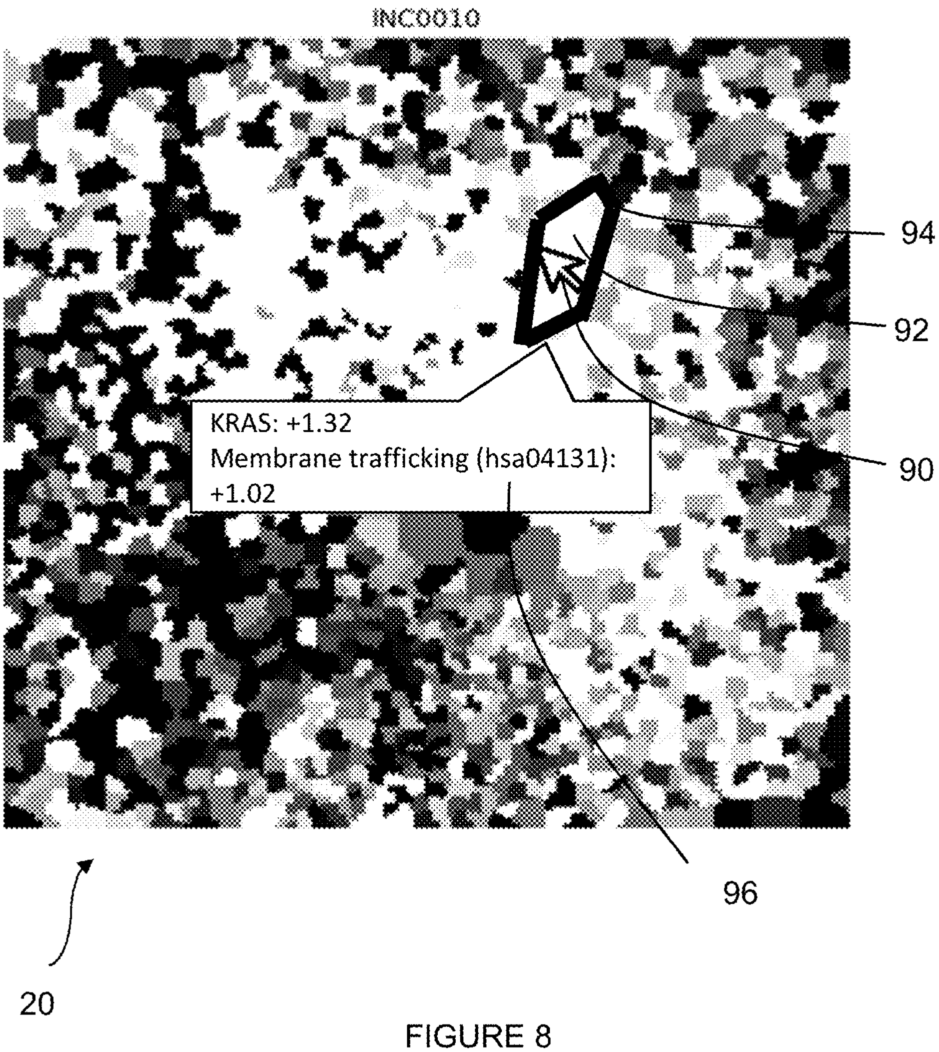
FIG. 8 is an example of a displaying image with mouse-over functionality.

In some embodiments, as shown in FIG. 8, the display circuitry 30 adds mouse-over functionality to the displaying image 20. When a cursor 90, controlled by the input device 18, hovers over the display positions of a biomolecule, the display circuitry 30 receives an input that is indicative of the position of the cursor 90. The display circuitry 30 uses the two-dimensional image format to obtain the name of the biomolecule associated with the position of the cursor in the two-dimensional image format and/or to obtain functional information relating to that biomolecule. The functional information may be obtained from bioinformatics databases such as the Gene Ontology or KEGG ontology. The display circuitry 30 instructs display of the name and/or functional information on or beside the displaying image 20. In other embodiments, any suitable information may be displayed as a mouse-over display.

As an example, at stage 74, the display circuitry 30 receives from the memory 40 a two-dimensional image format which may also be described as gene map. The display circuitry 30 receives omics data 72 which comprises transcriptome data for multiple subjects. The display circuitry 30 generates a displaying image 20 for one of the subjects. Each of the mapped areas corresponding to genes in the displaying image 20 are colored based on the respective Z-score normalized gene expression values of those genes. The display circuitry 30 repeats this process for the other subjects and presents the images for each subject side by side for comparison. The display circuitry 30 adds mouse-over functionality to show individual gene names (e.g. KRAS, APS etc.) and functional interpretation of mapped genes using e.g. the Gene Ontology or KEGG ontology.

In some embodiments, different levels of hierarchy may be represented in the displaying image 20. For example, a functionality level in an ontology may be selected to identify a group of genes, and the display circuitry 20 may highlight a region that is representative of that group.

In the example shown in FIG. 8, the cursor 90 hovers over a region of pixels 92 that is representative of the KRAS gene. The display circuitry 30 highlights a boundary 94 of the region 92. The display circuitry 30 displays a text box 96 including text associated with the KRAS gene. In the example shown, the text is 'KRAS: +1.32 Membrane trafficking (hsa04131): +1.02'. In other embodiments, any suitable text may be displayed that conveys any appropriate information. Any suitable display method may be used.

The displaying image 20 may provide a visually distinct representation of the omics data which may be considered to provide a gestalt of the data. When the omics data is transcriptomics data for a cohort, the displaying image 20 can be inspected to qualitatively see the difference between the subjects. Since genes that are plotted adjacently are highly correlated, regions of adjacent genes tend to show coherence. This means that there will be regions in the image that will be coherently under- or over-expressed across the cohort. It will therefore be possible, with practice, to become familiar with the co-expression profiles of certain genes in the dataset.

In some embodiments, a displaying image 20 may be used as a thumbnail image relating to a data set, for example a transcriptome data set. Use of a displaying image 20 as a thumbnail image may allow different data sets to be efficiently distinguished by eye.

It is a feature of the displaying image format that it exhibits coherence, in that neighboring pixels typically exhibit correlation. There is also typically coherence with respect to biological function, for example that neighboring pixels are likely to belong to the same Gene Ontology (GO) category and KEGG biochemical pathway. The image format is defined in an absolute way, so that transcriptome images from different sources can be meaningfully compared. The image format may be considered to be a constant map format that is reproducible.

In some embodiments, the display circuitry 20 performs stage 78 in addition to stage 76. In other embodiments, stage 78 is omitted. In further embodiments, stage 78 may be performed without stage 76 being performed.

At stage 78, the display circuitry 20 uses the displaying image 20 as input to a deep learning algorithm, such as a convolutional neural network (CNN) based machine learning model. The deep learning algorithm may be configured to perform any suitable operation on the displaying image 20. For example, the deep learning algorithm may be configured to classify the deep learning image. The deep learning algorithm processes the displaying image to obtain an output 80, for example a classification.

In the method of FIG. 3, unordered omics data is converted into an ordered displaying image 20. The conversion of unordered data into ordered data may allow the resulting ordered displaying image to be used as an input to a machine learning method that operates on images, such as a CNN. The machine learning method may be configured to perform any suitable task which may comprise any suitable processing of omics data.

In some embodiments, the displaying image 20 is augmented by parallel atlas images allowing the network to exploit non-stationary properties. Typically, a CNN may be considered to be blind to position within an image. The CNN may not make use of position within an image. However, in the case of omics data, it may be useful for position to be used, since biomolecules are represented at particular positions. Therefore, an atlas may be provided to the CNN along with the displaying image 20.

The atlas may comprise or be derived from the two-dimensional image format. The atlas may provide a mapping from biomolecule names or other information to positions in the displaying image 20. The atlas may comprise a set of labelled x, y co-ordinates.

The method of FIG. 3 provides for omics data to be displayed as an image in a way that preserves the relationships between each of the biomolecules in a dataset. Biomolecules will be adjacent to each other in the displaying image 20 is they have a strong correlation based on the dataset or if they have some kind of functional relationship based on prior knowledge. The images offer a qualitative overview of the data, which can be used as an adjunct to other bioinformatics methods that are used to process data. The images can be used as an icon or preview for files or UI elements relating to the omics data. The images allow the data to be visually inspected by the user and once the user gains experience, the user might learn to recognize patterns for multiple images based on the same two-dimensional format.

Since the adjacency of neighboring biomolecules is meaningful, the images are suitable for CNN based ML models that can classify the images.

A two-dimensional image format (for example, a gene map) may be obtained that is data driven (by using cohort data) or knowledge driven (by using biological database data). In some circumstances, obtaining the two-dimensional image format from external knowledge may lead to more functionally interpretable image coherence, which may be cohort-independent.

In other embodiments, different apparatus may be used to perform different processes, or parts of processes, of those described below. For example, a first apparatus may be used to perform the distance calculation, a second apparatus may be used to perform the embedding, a third apparatus may be used to perform the image adjustment, and a fourth apparatus may be used to display the image. Any suitable combination of apparatuses may be used.

In some embodiments, a first apparatus is used to produce the two-dimensional image format. The two-dimensional image format is then used by one or more further apparatuses to generate displaying images from omics data. The two-dimensional image format may only need to be produced once for a given set of biomolecules, and then can be reused for displaying many data sets that comprise that set of biomolecules.

In some embodiments, one or more of the stages described above may be omitted, or multiple stages may be combined.

When considering unordered data such as transcriptome data, one may consider how to impose an ordering which respects proximity relatedness in both low-level features and high-level features. Such an ordered space may enable better use of CNNs on unordered data. In some circumstances, such an ordered space may make the operation of DL algorithms more interpretable to a human observer. Such an ordered space may enable an interpretable integration of multiple modalities of data.

In embodiments described above in relation to FIGS. 3 to 8, a two-dimensional image format is obtained which provides an ordering of data, for example transcriptome data.

Figure 9:
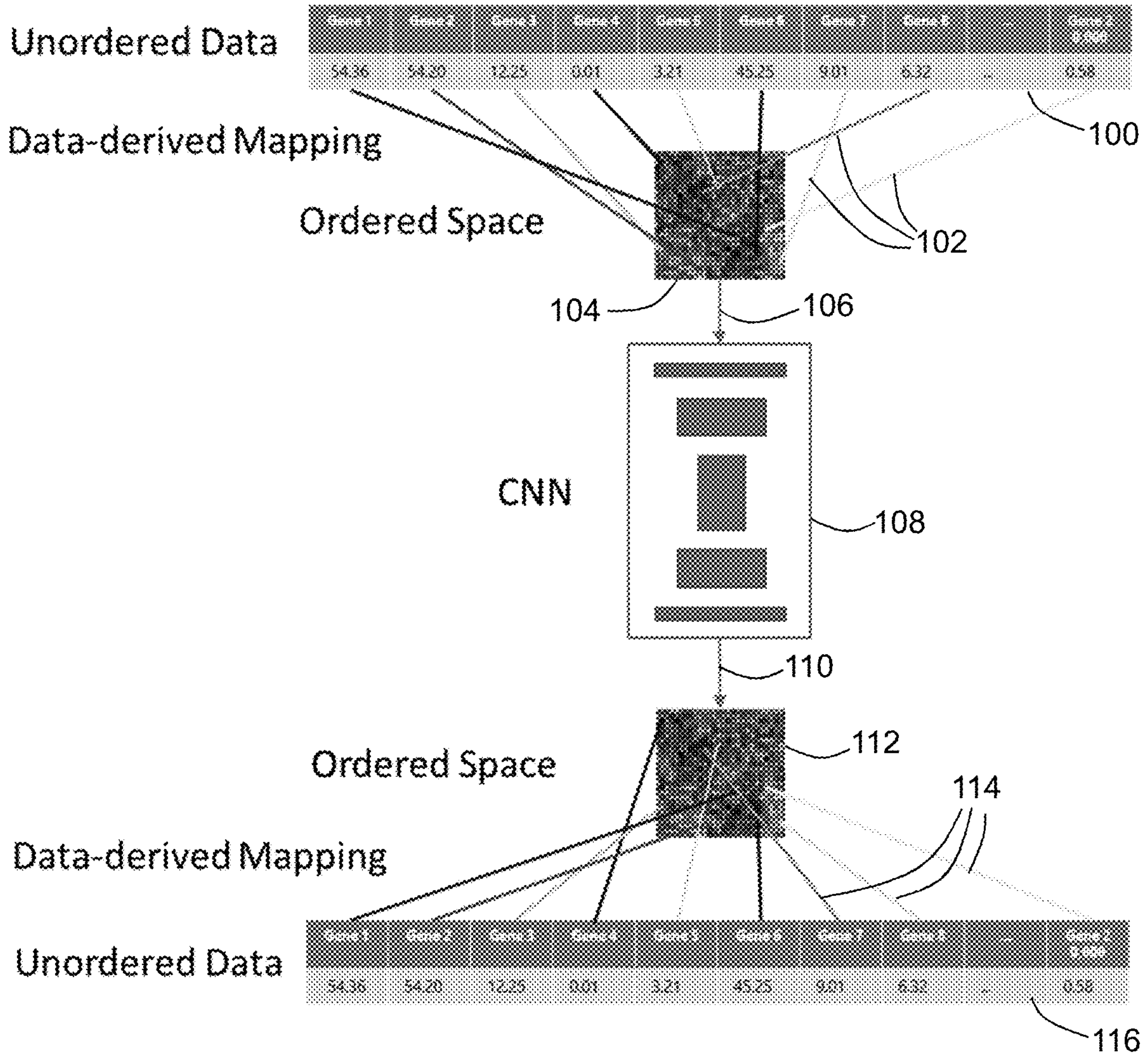
FIG. 9 is a flow chart illustrating in overview a method in accordance with an embodiment.
Figure 10:
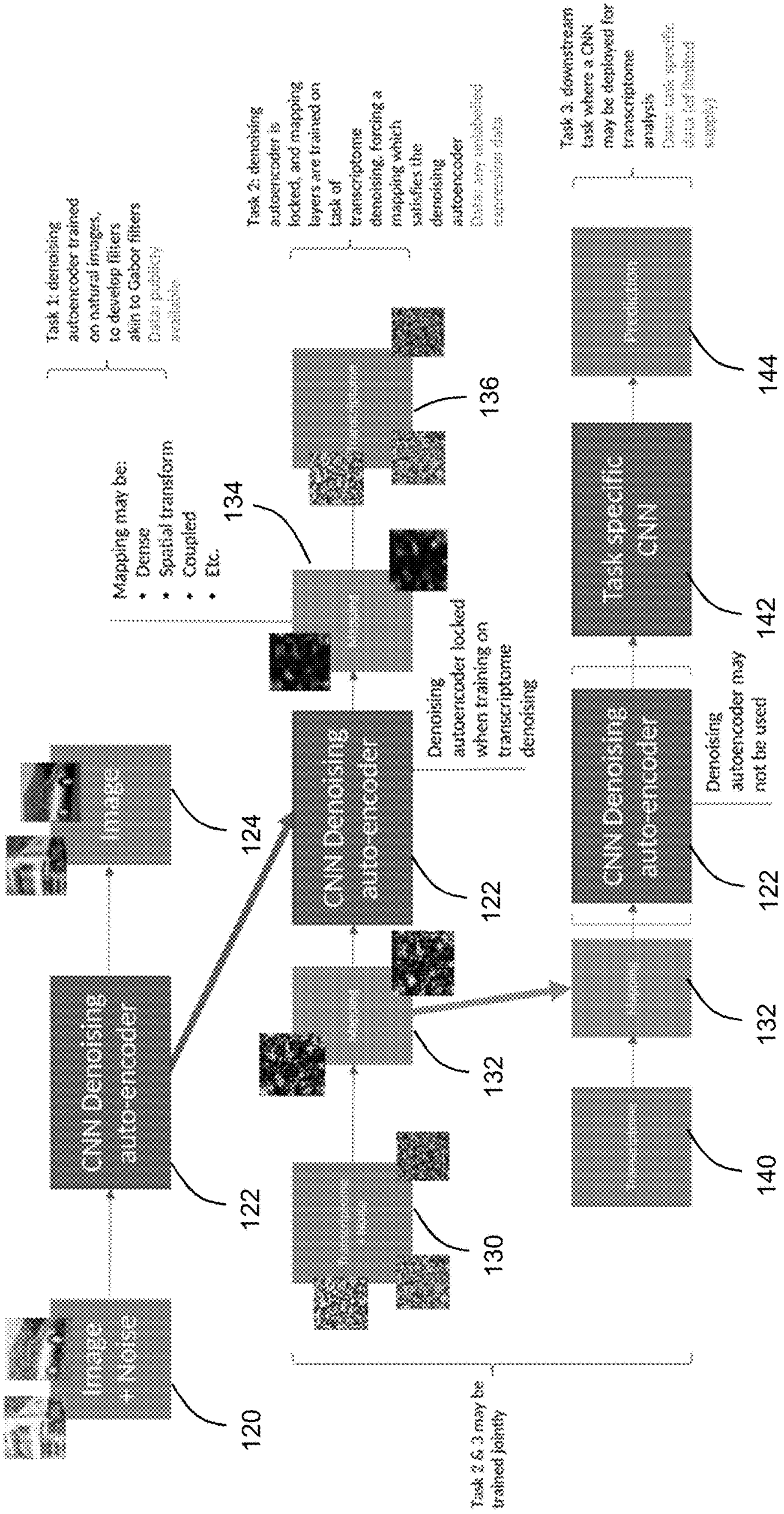
FIG. 10 is a flow chart illustrating in overview a method in accordance with an embodiment.

A further method of obtaining an ordering of data is described below in relation to FIGS. 9 and 10. In FIGS. 9 and 10, an encoder-decoder framework is used which allows a mapping from unordered input data to an ordered multi-dimensional space. The mapping is directly optimized in a data-derived fashion using unannotated and unordered data, for example transcriptome data. The multi-dimensional space is optimized to preserve the data when processed using a pre-trained CNN, for example an auto-encoder. This may implicitly force the multi-dimensional space to have a low-level and high-level spatial meaning. For data to be reconstructed accurately, the data must be mapped into a space in which it can be represented by the CNN.

FIG. 9 illustrates in overview a method of training a mapping to map unordered data into an ordered multi-dimensional space. The stages shown are FIG. 9 are repeated many times to optimize the mapping. The training of the mapping is performed using a pre-trained CNN 108 whose weights are locked during the process of training the mapping. The mapping is optimized to provide an ordered representation of previously unordered data, where the ordered representation can be successfully processed by the CNN.

First, the training circuitry 32 obtains a set of unordered data 100 from a training cohort. The set of unordered data 100 is described as unordered because it does not have a meaningful order, for example an order in which a degree of proximity corresponds to a degree of relatedness. Instead, the set of unordered data 100 is stored in a data format that may not be considered to provide a meaningful order, for example alphabetical by gene name.

In the embodiment of FIG. 9, the unordered data 100 is transcriptome data comprising gene expression values for a plurality of genes. The unordered data 100 comprises a list of genes Gene1, Gene2, Gene3 . . . and corresponding gene expression values. The training cohort comprises transcriptome data relating to a plurality of subjects, for example hundreds or thousands of subjects.

In other embodiments, any suitable set of unordered data 100 may be used, for example any set of omics data. The omics data may be any type of omics data that comprises a plurality of values, wherein each value of the plurality of values is associated with a respective biomolecule of a plurality of biomolecules. The data can be, for example, transcriptome data, wherein the biomolecules are genes, and the associated values are expression levels of those genes. Alternatively, the omics data could be another gene related omics data, where the biomolecules are germline DNA, SNPs, or somatic mutations, and the associated values are, for example, a degree of mutational impact. Alternatively, the omics data may correspond to a biomolecule such as a protein or metabolite, with the associated values being protein or metabolite abundance respectively (i.e. the omics data is proteome or metabolome data).

At stage 102 of FIG. 9, the training circuitry 32 performs a first mapping to map the set of unordered data 100 into an N-dimensional space. The N-dimensional space may have any suitable number of dimensions, for example one, two or three dimensions.

The first mapping may also be described as a first mapping layer. The first mapping may also be described as a data-derived mapping. In the first mapping, gene expression values from the set of unordered data are mapped to positions in N-dimensional space. In the embodiments of FIG. 9, the first mapping layer is a dense layer. The dense layer does not enforce one-to-one mapping, and allows weighting of the gene expression values.

In other embodiments, the mapping is a one-to-one mapping with no weighting. Such a mapping may use one or more algorithms similar to algorithms used in image registration.

Stage 102 is represented in FIG. 9 as a plurality of lines mapping gene expression values of the set of unordered data to positions in N-dimensional space. An output of stage 102 is a set of mapped data 104 which comprises data values for a plurality of positions in N-dimensional space.

In the embodiment of FIG. 9, N=2. For example, an input of 100 genes may be mapped into a two-dimensional space of 10 by 10. If the mapping is not one-to-one, an input of 100 genes could be mapped to a smaller space, for example 5 by 5. Such a mapping provides dimensionality reduction. In other embodiments, any suitable value of N may be used, for example N=3.

At stage 106, the training circuitry 32 inputs the mapped data 104 into a pre-trained CNN 108. The pre-trained CNN 108 is defined by parameters comprising a set of weights, which may also be described as processing weights or as convolutional processing weights. The weights of the CNN 108 are locked during the method of FIG. 9. A training of the pre-trained CNN 108 is described below with reference to FIG. 10.

In the embodiment of FIG. 9, the pre-trained CNN 108 is an auto-encoder. In other embodiments, any suitable pre-trained CNN 108 may be used. The pre-trained CNN 108 comprises a plurality of layers which are configured to operate on low- and high-level features of the mapped data.

The pre-trained CNN 108 encodes the mapped data 104 using high-level features to obtain a compressed representation of the mapped data 104, and subsequently obtains reconstructed data 112 from the compressed representation. The compressed representation may comprise an embedding which has a lower dimension than the mapped data. The encoding may comprise feature compression into low-, medium- and high-level features.

At stage 110, the pre-trained CNN 108 outputs the reconstructed data 112 into a further ordered N-dimensional space. The reconstructed data 112 comprises a plurality of data values having associated positions in the further ordered N-dimensional space.

At stage 114, the training circuitry 32 performs a second mapping to map the reconstructed data from the further ordered N-dimensional space into the original, unordered space, thereby obtaining a set of unordered output data 116. The second mapping may also be referred to as a second mapping layer. The second mapping may also be referred to as a data-driven mapping.

The set of unordered output data 116 has the same data format as the set of unordered data 100, which in the embodiment of FIG. 6 comprises a list of genes Gene1, Gene2, Gene3 . . . and corresponding gene expression values. Data values in N-dimensional space are mapped to gene expression values of the original, unordered space. Stage 114 is represented in FIG. 6 as a plurality of lines mapping positions in N-dimensional space to data elements of the output data in the unordered space.

In some embodiments, the second mapping is constrained to be an inverse of the first mapping. In other embodiments, the second mapping is not constrained in this manner.

The method of FIG. 9 is performed many times on sets of unordered data from the training cohort, to optimize parameters of the first and second mappings. For example, multiple batches of training cohort data may be used.

An aim of the optimization is to obtain mappings between ordered space and N-dimensional space that allow the pre-trained CNN 108 to reconstruct the mapped data with a minimal reconstruction loss. The representation of the data in N-dimensional space, when optimized, may be expected to have both high-level and low-level features of a type that are processable by a CNN. The representation of the data in N-dimensional space is an ordered data set of a form that can be processed by the CNN.

The optimizing of the parameters of the first and second mappings comprises optimizing with respect to a reconstruction loss. The reconstruction loss may comprise or be derived from a difference between the mapped data 104 and the reconstructed data 110. For example, the reconstruction loss may comprise a mean squared error, a mean absolute error, or a mutual information error.

The optimization may continue until the reconstruction loss is below a given threshold value. Any suitable method of optimization may be used. For example, the optimization method may comprise stochastic gradient descent or the Adam optimizer.

An accurate reconstruction of the unordered data may be considered to be indicative that the first mapping of the unordered data into the N-dimensional space results in an ordered representation that can be successfully processed by the CNN. Since the weights of the CNN are locked during the process of FIG. 9, any improvement in reconstruction may be assumed to be a result of an improvement in the mapping and is not the result of a change in the CNN itself.

FIG. 10 provides a more complete overview of a method of training a mapping and then using that mapping to provide input to a further CNN. The method of FIG. 7 may be considered as three tasks, Task 1, Task 2 and Task 3. In some embodiments, Task 2 and Task 3 are performed together.

In the method of FIG. 9 as described above, a mapping is trained to produce a representation of ordered data. The training uses a pre-trained CNN 108.

Task 1 of the method of FIG. 10 is a method of training a CNN. A CNN trained in Task 1 may be described as a pre-trained CNN and may be used in a method similar to that described in FIG. 9. In the embodiment of FIG. 10, the CNN that is trained in Task 1 is a denoising auto-encoder.

Task 2 of the method of FIG. 10 is similar to the method of FIG. 9 in that it involves the training of a mapping using a pre-trained CNN. In the embodiment of FIG. 10, the pre-trained CNN is obtained as an output of Task 1 and is locked during the training of the mapping performed at Task 2.

Task 3 of the method of FIG. 10 uses the mapping obtained at Task 2 to convert unordered data into ordered data in N-dimensional space, where the ordered data is suitable for use as an input to a CNN. The ordered data is then input to a task-specific CNN to produce a specified task. By converting the unordered data into ordered data that can be used as an input to a CNN, it becomes possible to use a CNN to process data that was originally unordered.

Task 3 comprises training the task-specific CNN to perform the specified task, which in the embodiment of FIG. 10 is a prediction. For example, the prediction may be a prediction of a condition or a pathology based on omics data.

Turning again to Task 1, Task 1 comprises training of a CNN denoising auto-encoder on the reconstruction of external data which has spatial ordering. In other embodiments, the training alternatively or additionally comprises training a CNN to classify external data which has spatial ordering or to process external data which has spatial ordering.

The external data may be data that is not omics data. In the embodiment of FIG. 10, the external data comprises natural images. Natural images may be images of real objects that are obtained by a conventional image capture method, for example using a camera.

In Task 1, the training circuitry 32 receives or generates a CNN denoising auto-encoder 122 which is to be trained.

The training circuitry 32 receives an image training cohort comprising a plurality of training image data sets, each of which is representative of a respective natural image.

The training circuitry 32 adds noise to each of the training image data sets to obtain a corresponding plurality of input image data sets 120. Each input image data set 120 comprises data representative of a natural image to which noise has been added.

The training circuitry 32 inputs an input image data set 120 (shown in FIG. 10 as 'Image+Noise') into the CNN denoising auto-encoder 122.

The CNN denoising auto-encoder 122 encodes the input image data set using high-level features to obtain a compressed representation of the input image data set 120.

The CNN denoising auto-encoder 122 then obtains reconstructed data from the compressed representation and outputs the reconstructed data as an output image data set 124 which is representative of an image.

Task 1 is repeated for many input data sets to train the CNN denoising auto-encoder 122 to receive a natural image plus noise and to output the natural image. The training comprises updating weights of the CNN denoising auto-encoder. The training may comprise optimization of a loss function. The loss function used in the training of Task 1 may be based on a difference between the output image data set 124 and the training image data set that was used to create the corresponding input image data set 120. The optimization may continue until the loss is below a given threshold value.

Task 1 may train the CNN denoising encoder 122 such that it develops filters similar to Gabor filters. In some embodiments, Gabor filters may be manually added to the CNN denoising auto-encoder. In some embodiments, the training of the CNN denoising auto-encoder may comprise prioritizing certain types of convolutions, which may comprise Gabor filters.

After Task 1, the weights of the CNN denoising auto-encoder 122 are locked. Task 1 has performed a pre-training of the CNN denoising auto-encoder 122. The CNN denoising auto-encoder 122 that is used in Task 2, and optionally in Task 3, may be described as a pre-trained CNN.

In other embodiments, the training circuitry 32 may receive a CNN denoising auto-encoder 122 that has already been pre-trained, for example by a separate apparatus.

In such embodiments, Task 1 may be omitted. In further embodiments, any suitable method of training the CNN denoising auto-encoder 122 may be used.

In further embodiments, only some of the weights of the CNN denoising auto-encoder are locked while Task 2 and/or Task 3 are being performed. The CNN denoising auto-encoder may continue to be trained during Task 2 and/or Task 3.

Task 2 and Task 3 are described below as separate training tasks, but in other embodiments Task 2 and Task 3 may be performed jointly. Task 2 and Task 3 may be alternated.

In Task 2, the training circuitry 32 receives or generates a first mapping 132 and second mapping 134, each of which is to be trained. In some embodiments, the first mapping 132 and second mapping 134 have a fixed relationship. For example, the second mapping 134 may be an inverse of the first mapping 132. In other embodiments, no such fixed relationship is defined. The first mapping 132 and second mapping 134 may be similar to the first mapping and second mapping described above with reference to FIG. 9.

The training circuitry 32 receives a transcriptome training cohort comprising a plurality of transcriptome data sets, each relating to a corresponding subject. The transcriptome data sets each comprise unordered data comprising gene expression value for a plurality of genes.

The training circuitry 32 adds noise to each of the transcriptome data sets to obtain a corresponding plurality of input transcriptome data sets 130. Each input transcriptome data set 130 comprises data representative of a transcriptome data set to which noise has been added. In other embodiments, any suitable omics data may be used instead of the transcriptome data sets.

The training circuitry 32 inputs an input transcriptome data set into the first mapping 132. The first mapping 132 is a spatial mapping which transforms the input transcriptome data set into an ordered N-dimensional space. An output of the first mapping 132 is a set of mapped data.

The first mapping 132 may comprise a dense layer, which may be parameterized as a fully dense layer. The first mapping 132 may comprise a fully connected layer which has the most degrees of freedom in mapping. The first mapping 132 may impose a one to one mapping between genes of the transcriptome and positions in the N-dimensional space. For example, the first mapping may be parameterized by a non-rigid spatial transformation.

The set of mapped data is input to the CNN denoising auto-encoder 122, which has been pre-trained at Task 1. The weights of the CNN denoising auto-encoder 122 are locked during Task 2.

The CNN denoising auto-encoder 122 processes the mapped data. The processing of the mapped data comprises encoding the mapped data to obtain a compressed representation of the mapped data, obtaining reconstructed data from the compressed representation, and outputting the reconstructed data into a further N-dimensional space. The pre-trained CNN denoising auto-encoder 122 may be considered to process the mapped data as if the mapped data were an image.

The training circuitry 32 inputs the reconstructed data that was output by the CNN denoising auto-encoder 122 into the second mapping 134. The second mapping 132 is a spatial mapping which transforms the reconstructed data from the further N-dimensional space to an output transcriptome data set 136.

The second mapping 134 may comprise a dense layer, which may be parameterized as a fully dense layer. The second mapping 134 may comprise a fully connected layer which has the most degrees of freedom in mapping. The second mapping 134 may impose a one to one mapping between positions in the further N-dimensional space and genes of an output transcriptome. For example, the second mapping may be parameterized by a non-rigid spatial transformation.

Task 2 is repeated for many input data sets to train the first mapping 132 to map from transcriptome data to data in the N-dimensional space and to training second mapping 134 to map from data in the further N-dimensional space to transcriptome data.

A loss function used in training Task 2 may comprise a reconstruction loss. The reconstruction loss may be based on the input transcriptome and the output transcriptome, for example using a difference between the input transcriptome and output transcriptome. The optimization may continue until the reconstruction loss is below a given threshold value.

In summary, in Task 2 the CNN denoising auto-encoder 122 is locked, and mapping layers 132, 134 are trained on the task of transcriptome denoising, which forces a mapping that enables the transcriptomics data to be denoised by the denoising auto-encoder. In other embodiments, the mapping layers may be trained using any suitable CNN.

In Task 3, the training circuitry 32 receives or generates a task-specific CNN to be trained. The task-specific CNN is a CNN that is configured to receive ordered input data and to use the ordered input data to perform a specific task, for example a classification. The task may comprise obtaining a prediction. The prediction may relate to, for example, a medical condition or pathology. The prediction may be a prediction of a treatment result, a prediction of survival, or a prediction of recurrence. The task may comprise predicting, for example, a cancer type, or whether a polyp returns. The task may also be described as a downstream task. The task may comprise a classification, for example a classification of a disease, a phenotype, or one or more disease characteristics.

The training circuitry 32 uses the first mapping 132 that was trained in Task 2. At least some parameters of the first mapping 132 are locked when used in Task 3. In the embodiment of FIG. 10, the training circuitry 32 also uses the CNN denoising auto-encoder 122 that was trained at Task 1. The CNN denoising auto-encoder 122 is locked when used in Task 3.

The training circuitry 32 receives labelled training data comprising a plurality of transcriptome data sets, each of which is labelled with ground truth data relating to a task to be performed by a task-specific CNN. The ground truth data may comprise, for example, data relating to condition or a pathology. The ground truth data may comprise an outcome, for example information on whether a polyp returns. The ground truth data may comprise a cancer type. In other embodiments, any suitable ground truth data may be used in relation to any suitable task to be performed by the task-specific CNN.

It is noted that in the embodiment of FIG. 10, the training data used to train the task-specific CNN in Task 3 is labelled data, whereas the training data used in training Task 2 may be unlabeled. In other embodiments, both Task 2 and Task 3 are trained using unlabeled data. In further embodiments, both Task 2 and Task 3 are trained using labelled data.

The training circuitry 32 inputs a transcriptome data set 140 into the first mapping 132. The first mapping 132 transforms the transcriptome data set 140 into an ordered N-dimensional space. An output of the first mapping 132 is a set of mapped data.

In the embodiment of FIG. 10, the training circuitry 32 inputs the mapped data into the CNN denoising auto-encoder 122. The CNN denoising auto-encoder 122. The CNN denoising auto-encoder 122 processes the mapped data. The processing of the mapped data comprises encoding the mapped data to obtain a compressed representation of the mapped data, obtaining reconstructed data from the compressed representation, and outputting the reconstructed data into a further N-dimensional space.

The training circuitry 32 inputs the reconstructed data to the task-specific CNN 142. The task-specific CNN processes the reconstructed data and outputs a prediction 144. For example, the prediction may comprise an outcome or a cancer type.

In other embodiments, the CNN denoising auto-encoder 122 is omitted from Task 3 and the mapped data is input into the task-specific CNN 142.

Task 3 is repeated for many labelled transcriptome data sets to train the task-specific CNN 142 to perform the task of making the prediction 144. A loss function used in training the task-specific CNN may comprise or be derived from a difference between the prediction 144 and the ground truth data for the transcriptome data set. The task-specific CNN is trained to produce a correct prediction.

In some embodiments, multiple task-specific CNNs may be trained to perform different tasks. In some embodiments, a task-specific CNN may be trained to perform multiple tasks, for example multiple related tasks.

In the embodiment of FIG. 10, Task 3 is trained after the training of Task 2 and the first mapping is not affected by the training of the task-specific CNN. In other embodiments, the first mapping may be trained using an error derived from the task or tasks performed by the task-specific CNN, which may be described as a downstream task or downstream tasks. Training using the error derived from the task or tasks may be simultaneous to training using a reconstruction loss as described above with reference to Task 2, or may be subsequent to training using the reconstruction loss. Task 2 and Task 3 may be trained together or in alternating fashion. By training Task 2 and Task 3 together or in alternating fashion, the first mapping may be trained such that it is suitable for the task performed in Task 3.

Once the task-specific CNN 142 has been trained, the task-specific CNN 142 may be deployed on new, unlabeled data to obtain a prediction by performing stages of Task 3 using a locked version of the trained task-specific CNN. The display circuitry 30 may display the prediction to a user, for example on display screen 16. The display circuitry 30 may additionally display spatially ordered transcriptome data.

Figure 11:
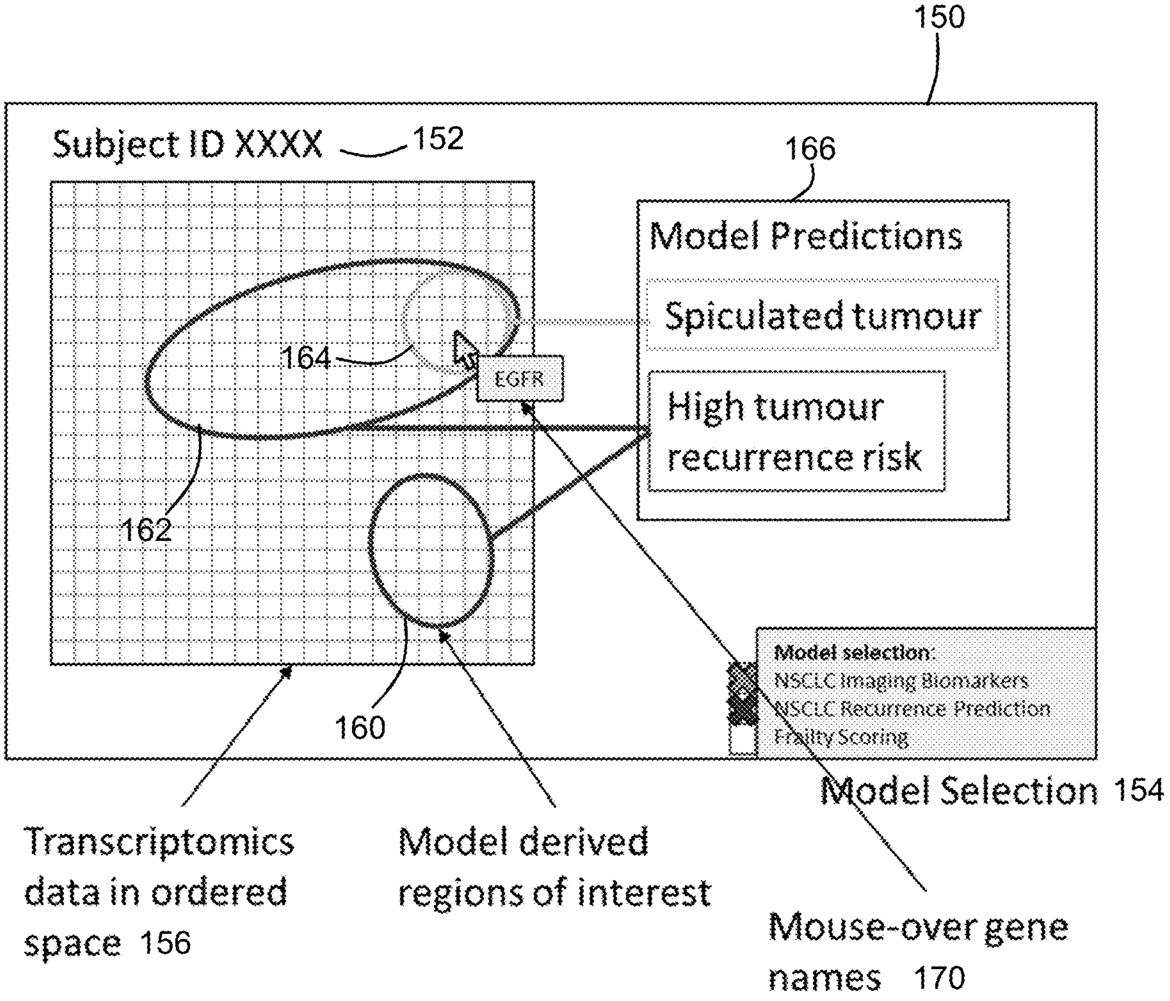
FIG. 11 shows a set of images processed by an auto-encoder.

FIG. 11 shows an example of a display of spatially ordered transcriptomics data and predictions. The display is provided on a user interface 150. The user interface 150 displays a subject ID 152, for example a patient identifier.

The display circuitry 30 receives a set of omics data from memory 40 or any suitable data store. In this embodiment, the set of omics data comprises transcriptome data for a single patient. In other embodiments, any suitable omics data may be used. The omics data may relate to multiple subjects.

The display circuitry 30 performs Task 3 of FIG. 10 using a locked version of the trained task-specific CNN and a locked version of the first mapping. In the embodiment of FIG. 11, three task-specific CNNs have been trained. A first task-specific CNN predicts NSCLC (Non-Small Cell Lung Cancer) imaging biomarkers. A second task-specific CNN predicts NSCLC recurrence. A third task-specific CNN performs frailty scoring. Task 3 may be performed on one or more of the trained task-specific CNNs in accordance with a user selection.

A user provides a selection of which task-specific CNN model or models to use by interacting with a model selection box 154 on the user interface 150. The user checks one or more of the models listed in the model selection box 154, which in this embodiment are the NSCLC (Non-Small Cell Lung Cancer) imaging biomarkers, NSCLC recurrence prediction, and frailty scoring. The display circuitry 30 receives input data that is representative of the user's selection. In other embodiments, any suitable task-specific model or models may be used, and any suitable type of user selection may be used, for example using a checkbox, drop-down menu, or free text input. In some embodiments, no selection of model(s) is made by the user and the model(s) are selected automatically.

For each of the selected task-specific CNN models, display circuitry 30 inputs the set of omics data to the first mapping 132, which produces mapped data. The display circuitry 30 inputs the mapped data to the CNN denoising auto-encoder 122. The CNN denoising auto-encoder 122 produces reconstructed data which is input to the trained task-specific CNN 142 by the display circuitry 30. The trained task-specific CNN 142 performs a transcriptome analysis using the reconstructed data. The trained task-specific CNN 142 outputs a prediction relating to the patient, for example, a prediction of an outcome or a prediction of a cancer type.

In other embodiments, the trained task-specific CNN 142 acts on the mapped data and the CNN denoising auto-encoder 122 is omitted from the deployment.

The training circuitry 150 displays a two-dimensional image 156 that is representative of a set of spatially ordered transcriptome data. The set of spatially ordered transcriptome data may be the mapped data produced by the first mapping or the reconstructed data produced by the CNN denoising auto-encoder. Each pixel of the two-dimensional image may correspond to a respective biomolecule. Alternatively, multiple pixels may correspond to a single biomolecule.

If N is greater than 2, the training circuitry 150 may display a two-dimensional image, for example by using a three-dimensional image viewer to produce a two-dimensional image from three-dimensional data.

The two-dimensional image 156 may be colored in any suitable manner, for example in a similar manner to that described above with reference to the two-dimensional image format produced by the method of FIG. 3. The two-dimensional image 156 may be colored in accordance with gene expression values. For example, a color scale may color pixels that are representative of genes that are over-expressed in red, pixels that are representative of genes that are under-expressed in blue, and pixels representative of genes that are little changed in grey. In other embodiments, any suitable color scale may be used to represent any suitable values included in the omics data.

The mapped data or reconstructed data may provide a visualization that is more understandable to a human than the unordered omics data. The image 156 may provide a visually distinct representation of the transcriptome data. Regions of adjacent genes may show coherence.

The display circuitry 30 identifies regions 160, 162, 164 of the spatially ordered transcriptome data image 154 relating to the predictions of the task-specific CNN models. For example, attention-based techniques may be used to identify genes that have a high contribution to the predictions. In the example of FIG. 11, the display circuitry 30 highlights each of the regions 160, 162, 164 with a respective outline. In other embodiments, any suitable method of highlighting one or more regions may be used. The display circuitry 30 also displays on the user interface a model prediction box 166 which describes the prediction provided by each of the regions 160, 162, 164. In the example of FIG. 11, regions 160 and 162 include genes associated with a high tumor recurrence risk. Region 164 includes genes associated with a spiculated tumor.

The mapping and regions are the same for all patients, so that data for different patients may be compared.

A user may use the visualization provided by the user interface 150 to observe whether gene expression values are high or low in regions 160, 162, 164.

The user may mouse-over a pixel of the image 156. When the user mouses over the pixel of the image, the display circuitry 30 displays pop-up text 170 including the name of the gene corresponding to that pixel. Mouse-over functionality may be similar to that described above with reference to FIG. 8.

In further embodiments, any suitable display method may be used. In some embodiments, a visualization may be task-specific. For example, adjacency within a spatially ordered image may be representative of adjacency in respect of a specific task.

In some embodiments, details of a prediction may be displayed without also displaying spatially ordered transcriptome data.

Data from more than one subject may be displayed, for example using methods described above with reference to FIG. 7.

In other embodiments, the first mapping may trained as described above and may be used to display omics data, for example transcriptomics data, without also being used as input to a task-specific CNN. Images may be used in any suitable way, for example as icons as described above.

In some embodiments, parallel atlas images may be used in combination with the spatially ordered transcriptome data.

The method of FIG. 10 may result in a trained mapping which transforms unordered transcriptome data into ordered data that is capable of being processed by a CNN. This may allow use of a trained CNN to make predictions based on the mapped data. The mapping may be obtained in a data-derived fashion based on training data. Using a trained auto-encoder to produce the mapping may result in an ordered data type that is suitable for processing by a CNN, so that a task-specific CNN can then be applied to the mapped data.

CNNs may be designed to exploit hierarchical ordering and to respect proximity. A mapping may be obtained that has an ordering that respects proximity relatedness in both low-level and high-level features. Such an ordered space may enable better use of a CNN on unordered data.

Spatially ordered data, for example that obtained using the first mapping, may enable use of conventional neural network processing technique. In general, CNNs may be less susceptible to overfitting than other models. A data burden of deploying a model may be reduced by using a CNN, or better performance may be achieved for the same amount of data.

Such an ordered space may make operation of deep learning algorithms more interpretable to a human observer. For example, attention-based method may be used or intermediate activation maps may be overlaid. A user may therefore see which regions of data are used in the model's decision-making. If a task-specific CNN produces a score, it may be possible to see why the score was obtained.

An ordered space may enable an interpretable integration of multiple modalities of data. Input may comprise data of multiple modalities, for example including clinical data or pathology data in addition to omics data.

Better visualization may be obtained when compared to unordered data. A refinement of space based on downstream tasks may enable informative arrangements of data from the perspective of a clinician. Data maybe ordered at both high-level and low-level. In some circumstances, the training of a mapping may allow for more degrees of representation than, for example, ordering by correlation. The method of FIG. 9 or of FIG. 10 may result in a mapping that captures complex higher-order features and relationships.

In some embodiments, the training of the mapping is performed partially or entirely on unlabeled data. It may often be the case that only a limited amount of labelled data is available. Training on unlabeled data may allow a larger amount of training data may be used, which may result in improved training. Training the mapping on unlabeled data may allow labelled data to be reserved for the training of the task-specific CNN if needed.

In some embodiments, the method of FIG. 9 or 10 may be initialized using correlation data and/or domain knowledge. The correlation data and/or domain knowledge may comprise data as described above in relation to the embodiment of FIG. 3, for example data included in bioinformatics database(s) 52 and/or study cohort data 56.

The method of FIG. 9 or 10 may be used to optimize or refine an initial ordering of data, for example transcriptome data. An initial ordering may be obtained using correlation or knowledge. For example, the method of FIG. 3 may be applied to unordered data to obtain initial ordered data. A mapping may be trained to transform the initial ordered data into mapped data that can be used in obtaining a task-specific prediction using a task-specific CNN.

The training of a mapping may be initialized using the two-dimensional image format obtained in the method of FIG. 3. In some circumstances, there may not be a unique solution to the task of ordering un-ordered data. It may be the case that the presence of local minima disrupts the optimization method. To achieve a more optimal mapping, it may be beneficial to initialize the training of the mapping using a non-random mapping such as the two-dimensional image format obtained in the method of FIG. 3.

Figure 12:
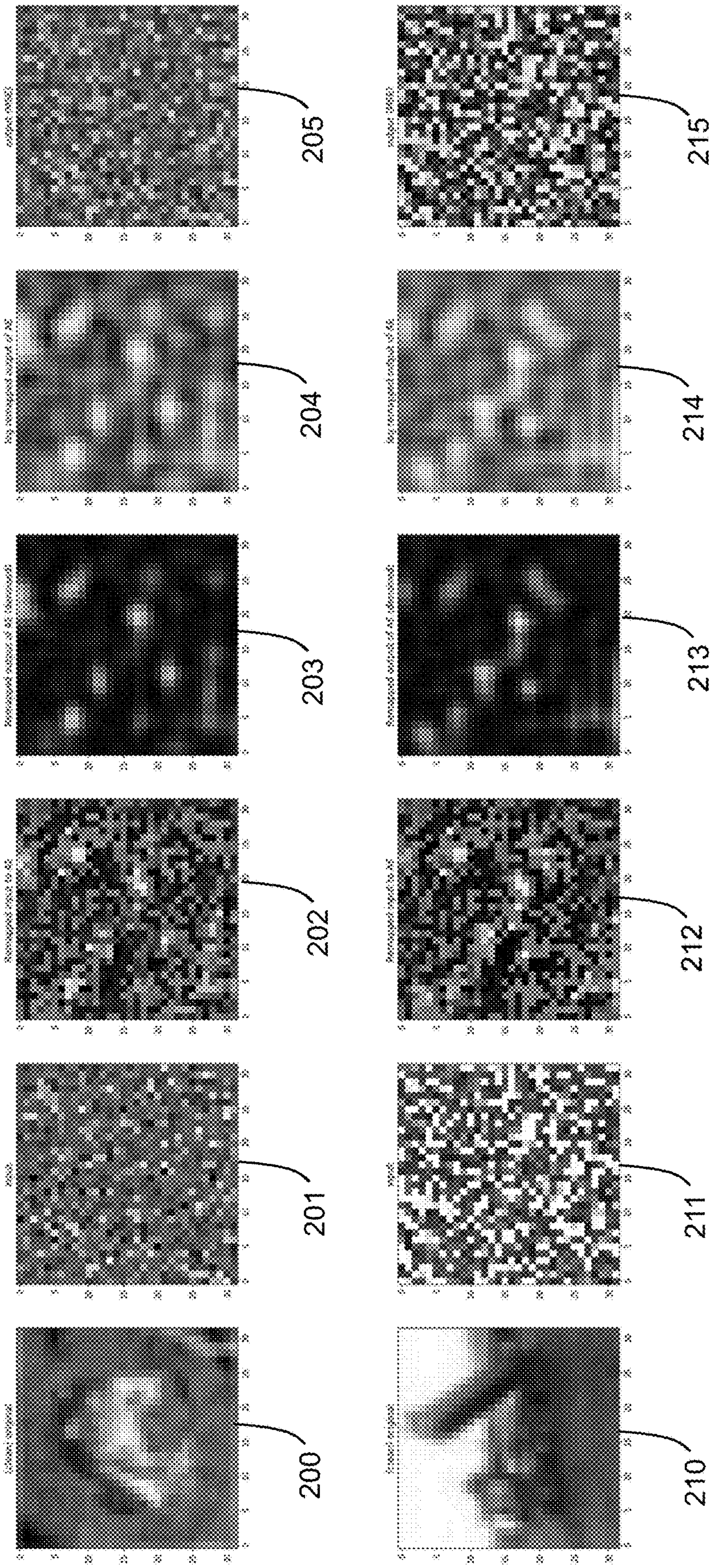
FIG. 12 shows an example of an output format.

FIG. 12 shows an example of remapping of different image data, to demonstrate how data may look when a first mapping, CNN denoising auto-encoder, and second mapping are applied.

A first natural image 200 and second natural image 210 are obtained. The natural images 200, 210 are low resolution and provide simple examples. The first natural image 200 and second natural image 210 are different and represent different objects. In the example of FIG. 12, a frog in represented in first natural image 200 and a truck is represented in second natural image 210.

The first and second natural images 200, 210 are each randomly remapped using the same random remapping. The resulting images 201, 211 may be considered to comprise unordered data, since they have been randomly rearranged.

A first mapping, which may be described as a dense remapping layer, is applied to images 201, 211 to obtain mapped images 202, 212. The mapped images may be considered to evolve some structure from the unordered data before it passes through a CNN denoising auto-encoder.

A CNN denoising auto-encoder is applied to mapped images 202, 212 to obtain output images 203, 213. It can be seen that the output of the CNN denoising auto-encoder is different for the different images, and that the output of the CNN denoising auto-encoder appears to be spatially meaningful.

Images 204, 214 show the output of the CNN denoising auto-encoder as a log output.

A second mapping, which may be described as a second dense remapping layer, is applied to the output of the CNN denoising auto-encoder and produces images 205, 215. It has been found that images 205, 215 are sufficient to reconstruct the remapped images 201, 211.

In further embodiments, methods as described above may be performed using any suitable unordered data, for example any suitable omics data, relating to any human or animal subject(s). Features of different embodiments may be combined.

Any suitable apparatus or combination of apparatuses may be used. For example, a first apparatus may be used to train a mapping and a second, different apparatus may be used to apply said mapping.

Certain embodiments provide a method of training mapping layers which transforms transcriptome data to mapping data which is suitable for convolutional neural network (CNN), the method comprising, acquiring CNN layers,
training first mapping layers which connect to input layer of the CNN layers and second mapping layers which connect to output layer of the CNN layers,
wherein the first mapping layers map the transcriptome data into n dimensional data,
wherein the second mapping layers transform output data of the CNN layers to data corresponds to the transcriptome data,
wherein the training of the first mapping layers and the second mapping layers is based on by minimizing a loss function considering the transcriptome data and the data by fixing the parameters of the CNN layers.

Certain embodiments provide a system comprising processing circuitry configured to: map unordered input data into an ordered space; perform subsequent convolutional processing of the data using a Convolutional Neural Network (CNN); and subsequently output data from the subsequent processing, which has been remapped into the original, unordered space, wherein the mapping(s) are derived in a data-derived fashion, by optimizing a reconstruction error between input data and output unordered data.

The mapping before the convolutional processing may be the inverse of the mapping following the convolutional processing.

The mapping may be parameterized a fully dense layer.

The mapping may comprise a one-to-one mapping, for example as parameterised by a non-rigid spatial transformation.

The ordered space may be of one, two or three dimensions.

The mapping may be initialised in a manner which is derived from domain knowledge.

Weights of the convolutional processing may be derived from a reconstruction of external data which has spatial ordering.

Weights of the convolutional processing may be derived from Gabor filters. At least some of the weights of the convolutional processing may be derived from training to classify external data which has spatial ordering. Weights of the convolutional processing may be derived from training to process external data which has spatial ordering. Some or all weights of the convolutional processing may be locked during optimisation of reconstruction of the unordered data.

The space may be simultaneously or subsequently optimised based on an error derived from a down-stream task or a plurality of down-stream tasks. The unordered data may comprise transcriptomic data. The reconstruction error may comprise a mean squared error. The reconstruction error may comprise a mean absolute error. The reconstruction error may comprise a mutual information error. The processing circuitry may be configured to process the data to perform a classification task.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An apparatus comprising processing circuitry configured to:
acquire convolutional neural network (CNN) layers; and
train a first mapping layer which connects to an input layer of the CNN layers, and a second mapping layer which connects to an output layer of the CNN layers, wherein the first mapping layer maps omics input data to N-dimensional data, and wherein the second mapping layer receives further N-dimensional data that is output by the CNN layers and maps the further N-dimensional data to omics output data;
wherein the training of the first mapping layer and the second mapping layer comprises fixing parameters of the CNN layers and minimizing a loss function, wherein the loss function is dependent on the input omics data and the output omics data.

2. The apparatus of claim 1, wherein the second mapping layer is an inverse of the first mapping layer.

3. The apparatus of claim 1, wherein the loss function is a reconstruction loss between the input omics data and the output omics data.

4. The apparatus of claim 1, wherein the CNN layers are layers of an auto-encoder.

5. The apparatus of claim 1, wherein the first mapping layer is parameterized as a fully dense layer.

6. The apparatus of claim 1, wherein the first mapping layer comprises a one-to-one mapping.

7. The apparatus of claim 1, wherein the processing circuitry is further configured to train the CNN layers to reconstruct spatially ordered data before the training of the first mapping layer and the second mapping layer.

8. The apparatus of claim 1, wherein the processing circuitry is further configured to train a task-specific model to obtain a task-specific output from ordered N-dimensional data obtained using the first mapping layer.

9. The apparatus of claim 8, wherein the task-specific output comprises a classification or a prediction.

10. The apparatus of claim 8, wherein the task-specific output comprises at least one of a classification of a disease, a classification of a phenotype, a classification of one or more disease characteristics, a prediction of a treatment response, a prediction of survival, and a prediction of recurrence.

11. The apparatus of claim 1, wherein the first mapping layer is simultaneously or subsequently optimized based on an error derived from a task performed by a task-specific model.

12. The apparatus of claim 11, wherein the processing circuitry is further configured to highlight in the ordered N-dimensional data regions of data that are relevant to one or more task-specific outputs.

13. The apparatus of claim 1, wherein the processing circuitry is further configured to display ordered N-dimensional data obtained using the first mapping layer.

14. The apparatus of claim 1, wherein the first mapping layer is initialized using domain knowledge.

15. The apparatus of claim 1, wherein the training of the first mapping layer is initialized using a two-dimensional image format obtained by a method comprising:

receiving omics data, the omics data comprising a plurality of values, wherein each value of the plurality of values is associated with a corresponding biomolecule of a plurality of biomolecules;

calculating a respective distance between each pair of biomolecules from the plurality of biomolecules;

applying a manifold learning method to the distances to obtain a respective position in a two-dimensional space mapped to each biomolecule of the plurality of biomolecules;

adjusting the positions to achieve a more even distribution of the positions over the two-dimensional space; and storing a two-dimensional image format of display positions for each biomolecule of the plurality of biomolecules based on the adjusted positions.

16. The apparatus of claim 1, wherein the omics data comprises at least one of transcriptome data, proteome data, metabolome data, or gene mutational data.

17. A method comprising:

acquiring convolutional neural network (CNN) layers; and training a first mapping layer which connects to an input layer of the CNN layers, and a second mapping layer which connects to an output layer of the CNN layers, wherein the first mapping layer maps omics input data to N-dimensional data, and wherein the second mapping layer receives further N-dimensional data that is output by the CNN layers and maps the further N-dimensional data to omics output data;

wherein the training of the first mapping layer and the second mapping layer comprises fixing parameters of the CNN layers and minimizing a loss function, wherein the loss function is dependent on the input omics data and the output omics data.

18. A method comprising:

obtaining a trained first mapping layer which maps omics input data to N-dimensional data, wherein the first mapping layer is trained in accordance with the method of claim 17;

using the trained first mapping layer to transform a set of omics input data into a set of spatially ordered data; and applying a task-specific model to the spatially ordered data to obtain a task-specific output.

* * * * *